(12) United States Patent
Briegel et al.

(10) Patent No.: US 12,552,916 B2
(45) Date of Patent: Feb. 17, 2026

(54) POLY ALPHA-1,3-GLUCAN ESTERS AND ARTICLES MADE THEREFROM

(71) Applicant: NUTRITION & BIOSCIENCES USA 4, INC., Rochester, NY (US)

(72) Inventors: Alicia C. Briegel, Wilmington, DE (US); Ross S. Johnson, Wilmington, DE (US); Vindhya Mishra, Wilmington, DE (US); Kathleen Opper, Wilmington, DE (US); Shalini Saxena, Wilmington, DE (US)

(73) Assignee: NUTRITION & BIOSCIENCES USA 4, INC., Wilmington, DE (US)

( * ) Notice: Subject to any disclaimer, the term of this patent is extended or adjusted under 35 U.S.C. 154(b) by 0 days.

(21) Appl. No.: 18/363,306

(22) Filed: Aug. 1, 2023

(65) Prior Publication Data

US 2024/0076477 A1 Mar. 7, 2024

Related U.S. Application Data

(63) Continuation of application No. 16/897,361, filed on Jun. 10, 2020, now Pat. No. 11,732,110, which is a continuation-in-part of application No. 16/461,097, filed as application No. PCT/US2017/062508 on Nov. 20, 2017, now abandoned.

(60) Provisional application No. 62/425,247, filed on Nov. 22, 2016.

(51) Int. Cl.
| | |
|---|---|
| *C08L 5/00* | (2006.01) |
| *C08B 37/00* | (2006.01) |
| *C08J 5/18* | (2006.01) |
| *C08K 5/11* | (2006.01) |
| *C09J 105/00* | (2006.01) |
| *D04H 3/009* | (2012.01) |
| *D04H 3/16* | (2006.01) |

(52) U.S. Cl.
CPC ............... *C08L 5/00* (2013.01); *C08B 37/00* (2013.01); *C08B 37/0006* (2013.01); *C08B 37/0009* (2013.01); *C08J 5/18* (2013.01); *C08K 5/11* (2013.01); *C09J 105/00* (2013.01); *D04H 3/009* (2013.01); *D04H 3/16* (2013.01); *C08J 2305/00* (2013.01); *C08L 2203/10* (2013.01); *C08L 2203/12* (2013.01); *C08L 2203/16* (2013.01); *D10B 2401/021* (2013.01); *D10B 2401/063* (2013.01); *D10B 2401/20* (2013.01)

(58) Field of Classification Search
CPC ....................................................... C08L 5/00
See application file for complete search history.

(56) References Cited

U.S. PATENT DOCUMENTS

| | | | |
|---|---|---|---|
| 2018/0021238 A1* | 1/2018 | Huh .................. | A61K 8/73 424/401 |
| 2019/0185893 A1* | 6/2019 | Guan ..................... | C08L 5/02 |
| 2019/0309096 A1* | 10/2019 | Lu ........................... | C11D 3/227 |
| 2019/0345267 A1* | 11/2019 | Adelman ............ | C08B 37/0021 |
| 2020/0131281 A1* | 4/2020 | Guan ..................... | C12P 19/04 |

FOREIGN PATENT DOCUMENTS

| WO | WO 2017218391 | * 12/2017 |
|---|---|---|
| WO | WO 2018098068 | * 5/2018 |

* cited by examiner

*Primary Examiner* — Irina Krylova

(57) ABSTRACT

The disclosure generally relates to poly alpha-1,3-glucan compositions and articles containing them. In particular interest is comprising poly alpha-1,3-glucan ester derivatives. The poly alpha-1,3-glucan derivatives are useful in thermoprocesses and in particular, injection molding processes.

12 Claims, No Drawings

POLY ALPHA-1,3-GLUCAN ESTERS AND ARTICLES MADE THEREFROM

This application is a continuation of application Ser. No. 16/897,361 (filed Jun. 10, 2020) (now U.S. Pat. No. 11,732,110), which is a continuation-in-part of application Ser. No. 16/461,097 (filed May 15, 2019), which is a National Stage application of International Application No. PCT/US17/62508 (filed Nov. 20, 2017), which claims the benefit of U.S. Provisional Application No. 62/425,247 (filed Nov. 22, 2016). All of these prior applications are incorporated herein by reference in their entirety.

FIELD OF THE INVENTION

The disclosure generally relates to poly alpha-1,3-glucan derivatives for use in thermoprocesses and articles containing the aforementioned, and more particularly, articles made from thermoprocesses and comprising poly alpha-1,3-glucan ester derivatives.

BACKGROUND OF THE INVENTION

Bio-sourced/bio-degradable polymers are in demand as a substitute for incumbent polymeric materials. Poly alpha-1,3-glucan is a polysaccharide that is biodegradable and can be economically made from renewable resource-based feedstocks. Interest exists in the use of poly alpha-1,3-glucan and/or its derivatives in articles historically comprising incumbent polymers.

SUMMARY OF THE INVENTION

A first aspect of the present invention relates to a composition comprising a poly alpha-1,3-glucan ester compound represented by the structure:

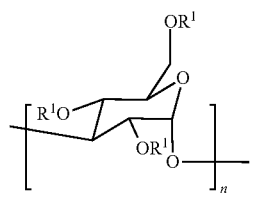

wherein: (i) n is at least 6 and (ii) each $R^1$ is independently selected from H or an acyl group, the acyl group being independently selected from the group consisting of: a) an acetyl; b) a benzoyl; c)

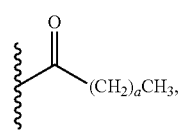

wherein a is independently 7-24; and
d)

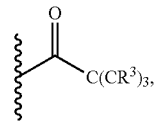

wherein $R^3$ can be independently selected from H atoms, linear alkyl groups, branched alkyl groups, cyclic alkyl groups, and aryl groups comprising from one to 24 carbon atoms;
with the proviso that if $R^1$ is acetyl then at least one other $R^1$ is

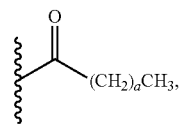

wherein a is independently 7-24 or a benzoyl (or with the proviso that, if $R^1$ is acetyl, then
at least one other $R^1$ is a benzoyl or

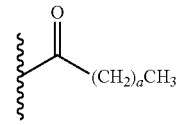

wherein a is independently 7-24),
and wherein the poly alpha-1,3-glucan ester compound has a degree of substitution of 0.001 to 3.0.

A second aspect of the present invention relates to a composition comprising: (A) a poly alpha-1,3-glucan ester compound represented by the structure:

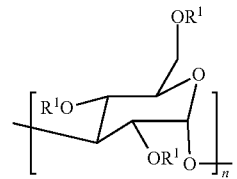

wherein: n is at least 6 and each $R^1$ is independently selected from H or an acyl group, the acyl group being independently selected from the group consisting of: (i) an acetyl,
(ii) a formyl, and (iii)

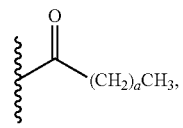

wherein a is independently 0-6 (or 1-6), wherein the poly alpha-1,3-glucan ester compound has a degree of substitution of 0.001 to 3.0; and (B) a plasticizer.

DETAILED DESCRIPTION OF THE INVENTION

Ranges and Preferred Variants

Any range set forth herein expressly includes its endpoints unless explicitly stated otherwise. Setting forth an amount, concentration, or other value or parameter as a range specifically discloses all possible ranges formed from any possible upper range limit and any possible lower range limit, regardless of whether such pairs of upper and lower range limits are expressly disclosed herein. Compounds, processes and articles described herein are not limited to specific values disclosed in defining a range in the description.

The disclosure herein of any variation in terms of materials, chemical entities, methods, steps, values, and/or ranges, etc.—whether identified as preferred or not—of the processes, compounds and articles described herein specifically intends to include any possible combination of materials, methods, steps, values, ranges, etc. For the purpose of providing photographic and sufficient support for the claims, any disclosed combination is a preferred variant of the processes, compounds, and articles described herein.

In this description, if there are nomenclature errors or typographical errors regarding the chemical name any chemical species described herein, including curing agents of formula (I), the chemical structure takes precedence over the chemical name. And, if there are errors in the chemical structures of any chemical species described herein, the chemical structure of the chemical species that one of skill in the art understands the description to intend prevails.

Definitions

As used herein, the article "a" refers to one as well as more than one and does not necessarily limit its referent noun to the grammatical category of singular number.

As used herein, the terms "about" and "at or about", when used to modify an amount or value, refers to an approximation of an amount or value that is more or less than the precise amount or value recited in the claims or described herein. The precise value of the approximation is determined by what one of skill in the art would recognize as an appropriate approximation to the precise value. As used herein, the term conveys that similar values, not precisely recited in the claims or described herein, can bring about results or effects that are equivalent to those recited in the claims or described herein, for which one of skill in the art would acknowledge as acceptably brought about by the similar values.

The terms "percent by volume", "volume percent", "vol %" and "v/v %" are used interchangeably herein. The percent by volume of a solute in a solution can be determined using the formula: [(volume of solute)/(volume of solution)]×100%.

The terms "percent by weight", "weight percentage (wt %)" and "weight-weight percentage (% w/w)" are used interchangeably herein. Percent by weight refers to the percentage of a material on a mass basis as it is comprised in a composition, mixture or solution.

As used herein, "weight average molecular weight" or "Mw" is calculated as Mw=$\Sigma NiMi^2/\Sigma NiMi$; where Mi is the molecular weight of a chain and Ni is the number of chains of that molecular weight. The weight average molecular weight can be determined by techniques such as static light scattering, gas chromatography (GC), high performance liquid chromatography (HPLC), gel permeation chromatography (GPC), small angle neutron scattering, X-ray scattering, and sedimentation velocity. As used herein, "number average molecular weight" or "Mn" refers to the statistical average molecular weight of all the polymer chains in a sample. The number average molecular weight is calculated as Mn=$\Sigma NiMi /\Sigma Ni$ where Mi is the molecular weight of a chain and Ni is the number of chains of that molecular weight. The number average molecular weight of a polymer can be determined by techniques such as gel permeation chromatography, viscometry via the (Mark-Houwink equation), and colligative methods such as vapor pressure osmometry, end-group determination, or proton NMR.

The terms "increased", "enhanced" and "improved" are used interchangeably herein. These terms may refer to, for example, a quantity or activity that is at least 1%, 2%, 3%, 4%, 5%, 6%, 7%, 8%, 9%, 10%, 20%, 30%, 40%, 50%, 60%, 70%, 80%, 90%, 100%, 125%, 150%, 175%, or 200% (or any integer between 1% and 200%) more than the quantity or activity for which the increased quantity or activity is being compared.

As used herein, the term "article" refers to an unfinished or finished item, thing, object, or an element or feature of an unfinished or finished item, thing or object. As used herein, when an article is unfinished, the term "article" may refer to any item, thing, object, element, device, etc. that has a form, shape, configuration that may undergo further processing in order to become a finished article. As used herein, when an article is finished, the term "article" refers to an item, thing, object, element, device, etc. that is in a form, shape, configuration that is suitable for a particular use/purpose without further processing of the entire entity or a portion of it.

An article may comprise one or more element(s) or subassembly(ies) that either are partially finished and awaiting further processing or assembly with other elements/subassemblies that together will comprise a finished article. In addition, as used herein, the term "article" may refer to a system or configuration of articles.

The terms "poly alpha-1,3-glucan", "alpha-1,3-glucan polymer", "alpha-1,3-glucan", "glucan polymer" and the like are used interchangeably herein. Poly alpha-1,3-glucan is a polymer comprising glucose monomeric units linked together by glycosidic linkages, wherein at least about 50% of the glycosidic linkages are alpha-1,3-glycosidic linkages. Poly alpha-1,3-glucan is a type of polysaccharide. The structure of poly alpha-1,3-glucan can be illustrated as follows:

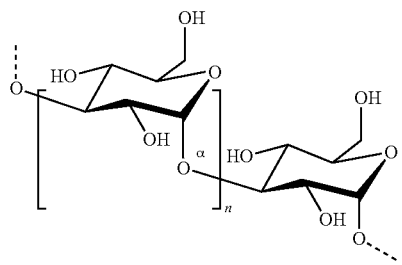

The poly alpha-1,3-glucan that can be used for preparing poly alpha-1,3-glucan ester compounds described herein can be prepared using chemical methods. Alternatively, it can be prepared by extracting it from various organisms, such as fungi, that produce poly alpha-1,3-glucan. Alternatively still, poly alpha-1,3-glucan can be enzymatically produced from sucrose using one or more glucosyltransferase (gtf) enzymes (e.g., gtfJ), such as described in U.S. Pat. Nos. 7,000,000, and 9,080,195, and 8,642,757 (all three of which are incorporated herein by reference), for example.

The terms "glucosyltransferase enzyme", "gtf enzyme", "gtf enzyme catalyst", "gtf", and "glucansucrase" are used interchangeably herein. The activity of a gtf enzyme herein catalyzes the reaction of sucrose substrate to make products poly alpha-1,3-glucan and fructose. Other products (byproducts) of a gtf reaction can include glucose (where glucose is hydrolyzed from the glucosyl-gtf enzyme intermediate complex), various soluble oligosaccharides (DP2-DP7), and leucrose (where glucose of the glucosyl-gtf enzyme intermediate complex is linked to fructose). Leucrose is a disaccharide composed of glucose and fructose linked by an alpha-1,5 linkage. Wild type forms of glucosyltransferase enzymes generally contain (in the N-terminal to C-terminal direction) a signal peptide, a variable domain, a catalytic domain, and a glucan-binding domain. A gtf herein is classified under the glycoside hydrolase family 70 (GH70) according to the CAZy (Carbohydrate-Active EnZymes) database (Cantarel et al., *Nucleic Acids Res.* 37:D233-238, 2009).

The percentage of glycosidic linkages between the glucose monomer units of poly alpha-1,3-glucan used to prepare poly alpha-1,3-glucan ester compounds described herein that are alpha-1,3 is at least about 50%, 60%, 70%, 80%, 90%, 95%, 96%, 97%, 98%, 99%, or 100% (or any integer value between 50% and 100%). In such embodiments, accordingly, poly alpha-1,3-glucan has less than about 50%, 40%, 30%, 20%, 10%, 5%, 4%, 3%, 2%, 1%, or 0% (or any integer value between 0% and 50%) of glycosidic linkages that are not alpha-1,3.

Poly alpha-1,3-glucan used to produce poly alpha-1,3-glucan ester compounds described herein is preferably linear/unbranched. In certain embodiments, poly alpha-1,3-glucan has no branch points or less than about 10%, 9%, 8%, 7%, 6%, 5%, 4%, 3%, 2%, or 1% branch points as a percent of the glycosidic linkages in the polymer. Examples of branch points include alpha-1,6 branch points, such as those present in mutan polymer.

The terms "glycosidic linkage" and "glycosidic bond" are used interchangeably herein and refer to the type of covalent bond that joins a carbohydrate (sugar) molecule to another group such as another carbohydrate. The term "alpha-1,3-glycosidic linkage" as used herein refers to the type of covalent bond that joins alpha-D-glucose molecules to each other through carbons 1 and 3 on adjacent alpha-D-glucose rings. This linkage is illustrated in the poly alpha-1,3-glucan structure provided above. Herein, "alpha-D-glucose" is referred to as "glucose".

The terms "poly alpha-1,3-glucan ester compound", "poly alpha-1,3-glucan ester", alpha-1,3-glucan ester, "poly alpha-1,3-glucan ester derivative" and the like are used interchangeably herein. A poly alpha-1,3-glucan ester compound herein can be represented by the structure:

$$\left[\begin{array}{c}\text{OR}^1\\ \text{R}^1\text{O}\\ \text{OR}^1\end{array}\right]_n$$

Regarding the formula of this structure, n can be at least 6, and each $R^1$ can independently be a hydrogen atom (H) or an acyl group. A poly alpha-1,3-glucan ester compound herein has a degree of substitution of about 0.001 to about 3.0.

Poly alpha-1,3-glucan ester compounds disclosed herein are synthetic, man-made compounds.

A poly alpha-1,3-glucan ester compound is termed an "ester" herein by virtue of comprising the substructure —$C_G$—O—CO—C—, where "—$C_G$—" represents carbon 2, 4, or 6 of a glucose monomeric unit of a poly alpha-1,3-glucan ester compound, and where "—CO—C—" is comprised in the acyl group.

Examples of linear "acyl group" groups herein include:
a methanoyl group (—CO—H),
a ethanoyl group (—CO—$CH_3$),
a propanoyl group (—CO—$CH_2$—$CH_3$),
a butanoyl group (—CO—$CH_2$—$CH_2$—$CH_3$),
a pentanoyl group (—CO—$CH_2$—$CH_2$—$CH_2$—$CH_3$),
a hexanoyl group (—CO—$CH_2$—$CH_2$—$CH_2$—$CH_2$—$CH_3$),
a heptanoyl group (—CO—$CH_2$—$CH_2$—$CH_2$—$CH_2$—$CH_2$—$CH_3$),
an octanoyl group (—CO—$CH_2$—$CH_2$—$CH_2$—$CH_2$—$CH_2$—$CH_2$—$CH_3$),
a nonanoyl group (—CO—$CH_2$—$CH_2$—$CH_2$—$CH_2$—$CH_2$—$CH_2$—$CH_2$—$CH_3$),
a decanoyl group (—CO—$CH_2$—$CH_2$—$CH_2$—$CH_2$—$CH_2$—$CH_2$—$CH_2$—$CH_2$—$CH_3$),
a undecanoyl group (—CO—$CH_2$—$CH_2$—$CH_2$—$CH_2$—$CH_2$—$CH_2$—$CH_2$—$CH_2$—$CH_2$—$CH_3$),
a dodecanoyl group (—CO—$CH_2$—$CH_2$—$CH_2$—$CH_2$—$CH_2$—$CH_2$—$CH_2$—$CH_2$—$CH_2$—$CH_2$—$CH_3$),
a tridecanoyl group (—CO—$CH_2$—$CH_2$—$CH_2$—$CH_2$—$CH_2$—$CH_2$—$CH_2$—$CH_2$—$CH_2$—$CH_2$—$CH_2$—$CH_3$),
a tetradecanoyl group (—CO—$CH_2$—$CH_2$—$CH_2$—$CH_2$—$CH_2$—$CH_2$—$CH_2$—$CH_2$—$CH_2$—$CH_2$—$CH_2$—$CH_2$—$CH_3$),
a pentadecanoyl group (—CO—$CH_2$—$CH_2$—$CH_2$—$CH_2$—$CH_2$—$CH_2$—$CH_2$—$CH_2$—$CH_2$—$CH_2$—$CH_2$—$CH_2$—$CH_2$—$CH_3$),
a hexadecanoyl group (—CO—$CH_2$—$CH_2$—$CH_2$—$CH_2$—$CH_2$—$CH_2$—$CH_2$—$CH_2$—$CH_2$—$CH_2$—$CH_2$—$CH_2$—$CH_2$—$CH_2$—$CH_3$),
a heptadecanoyl group (—CO—$CH_2$—$CH_2$—$CH_2$—$CH_2$—$CH_2$—$CH_2$—$CH_2$—$CH_2$—$CH_2$—$CH_2$—$CH_2$—$CH_2$—$CH_2$—$CH_2$—$CH_2$—$CH_3$),
an octadecanoyl group (—CO—$CH_2$—$CH_2$—$CH_2$—$CH_2$—$CH_2$—$CH_2$—$CH_2$—$CH_2$—$CH_2$—$CH_2$—$CH_2$—$CH_2$—$CH_2$—$CH_2$—$CH_2$—$CH_2$—$CH_3$),
a nonadecanoyl group (—CO—$CH_2$—$CH_2$—$CH_2$—$CH_2$—$CH_2$—$CH_2$—$CH_2$—$CH_2$—$CH_2$—$CH_2$—$CH_2$—$CH_2$—$CH_2$—$CH_2$—$CH_2$—$CH_2$—$CH_2$—$CH_3$),
an eicosanoyl group (—CO—$CH_2$—$CH_2$—$CH_2$—$CH_2$—$CH_2$—$CH_2$—$CH_2$—$CH_2$—$CH_2$—$CH_2$—$CH_2$—$CH_2$—$CH_2$—$CH_2$—$CH_2$—$CH_2$—$CH_2$—$CH_2$—$CH_3$),
an uneicosanoyl group (—CO—$CH_2$—$CH_2$—$CH_2$—$CH_2$—$CH_2$—$CH_2$—$CH_2$—$CH_2$—$CH_2$—$CH_2$—$CH_2$—$CH_2$—$CH_2$—$CH_2$—$CH_2$—$CH_2$—$CH_2$—$CH_2$—$CH_2$—$CH_3$),
a docosanoyl group (—CO—$CH_2$—$CH_2$—$CH_2$—$CH_2$—$CH_2$—$CH_2$—$CH_2$—$CH_2$—$CH_2$—$CH_2$—$CH_2$—$CH_2$—$CH_2$—$CH_2$—$CH_2$—$CH_2$—$CH_2$—$CH_2$—$CH_2$—$CH_2$—$CH_3$), a tricosanoyl group (—CO—CH$_2$—CH$_2$—CH$_2$—CH$_2$—CH$_2$—CH$_2$—CH$_2$—CH$_2$—CH$_2$—CH$_2$—CH$_2$—CH$_2$—CH$_2$—CH$_2$—CH$_2$—CH$_2$—CH$_2$—CH$_2$—CH$_2$—CH$_2$—CH$_2$—CH$_3$), a tetracosanoyl group (—CO—CH$_2$—CH$_2$—CH$_2$—CH$_2$—CH$_2$—CH$_2$—CH$_2$—CH$_2$—CH$_2$—CH$_2$—CH$_2$—CH$_2$—CH$_2$—CH$_2$—CH$_2$—CH$_2$—CH$_2$—CH$_2$—CH$_2$—CH$_2$—CH$_2$—CH$_3$), a pentacosanoyl group (—CO—CH$_2$—CH$_2$—CH$_2$—CH$_2$—CH$_2$—CH$_2$—CH$_2$—CH$_2$—CH$_2$—CH$_2$—CH$_2$—CH$_2$—CH$_2$—CH$_2$—CH$_2$—CH$_2$—CH$_2$—CH$_2$—CH$_2$—CH$_2$—CH$_2$—CH$_2$—CH$_3$), and a hexacosanoyl group (—CO—CH$_2$—CH$_2$—CH$_2$—CH$_2$—CH$_2$—CH$_2$—CH$_2$—CH$_2$—CH$_2$—CH$_2$—CH$_2$—CH$_2$—CH$_2$—CH$_2$—CH$_2$—CH$_2$—CH$_2$—CH$_2$—CH$_2$—CH$_2$—CH$_2$—CH$_2$—CH$_2$—CH$_3$), for example.

Common names for the above are formyl (methanoyl group), acetyl (ethanoyl group), propionyl (propanoyl group), butyryl (butanoyl group), valeryl (pentanoyl group), caproyl (hexanoyl group); enanthyl (heptanoyl group), caprylyl (octanoyl group), pelargonyl (nonanoyl group), capryl (decanoyl group), lauroyl (dodecanoyl group), myristyl (tetradecanoyl group), palmityl (hexadecanoyl group), stearyl (octadecanoyl group), arachidyl (eicosanoyl group), behenyl (docosanoyl group), lignoceryl (tetracosanoyl group), and cerotyl (hexacosanoyl group). The common names will be used herein when possible.

Examples of branched acyl groups include a 2-methylpropanoyl group; a 2-methylbutanoyl group; a 2,2-dimethylpropanoyl group; a 3-methylbutanoyl group; a 2-methylpentanoyl group; a 3-methylpentanoyl group; a 4-methylpentanoyl group; a 2,2-dimethylbutanoyl group; a 2,3-dimethylbutanoyl group; a 3,3-dimethylbutanoyl group; a 2-ethylbutanoyl group; and a 2-ethylhexanoyl group.

Examples of cyclic acyl groups include a cyclopropanoyl group; a cyclobutanoyl group; a cyclopentanoyl group; a cyclohexanoyl group; and a cycloheptanoyl group.

The carbonyl group (—CO—) of the acyl group is ester-linked to carbon 2, 4, or 6 of a glucose monomeric unit of a poly alpha-1,3-glucan ester compound.

Regarding nomenclature, a poly alpha-1,3-glucan ester compound can be referenced herein by referring to the organic acid(s) corresponding with the acyl group(s) in the compound. For example, an ester compound comprising acetyl groups can be referred to as a poly alpha-1,3-glucan acetate, an ester compound comprising propionyl groups can be referred to as a poly alpha-1,3-glucan propionate, and an ester compound comprising butyryl groups can be referred to as a poly alpha-1,3-glucan butyrate. However, this nomenclature is not meant to refer to the poly alpha-1,3-glucan ester compounds herein as acids per se.

"Poly alpha-1,3-glucan triacetate" herein refers to a poly alpha-1,3-glucan ester compound with a degree of substitution by acetyl groups of 2.75 or higher.

The terms "poly alpha-1,3-glucan monoester" and "monoester" are used interchangeably herein. A poly alpha-1,3-glucan monoester contains only one type of acyl group. Examples of such monoesters are poly alpha-1,3-glucan acetate (comprises acetyl groups), poly alpha-1,3-glucan propionate (comprises propionyl groups), and etc.

The terms "poly alpha-1,3-glucan mixed ester" and "mixed ester" are used interchangeably herein. A poly alpha-1,3-glucan mixed ester contains two or more types of an acyl group. Examples of such mixed esters are poly alpha-1,3-glucan acetate propionate (comprises acetyl and propionyl groups), poly alpha-1,3-glucan acetate butyrate (comprises acetyl and butyryl groups), and etc.

The term "degree of substitution" (DOS or DS) as used herein refers to the average number of hydroxyl groups substituted in each monomeric unit (glucose) of a poly alpha-1,3-glucan ester compound. Each monomeric unit has three hydroxyl groups which can be substituted with acyl groups to form an ester group. Thus, the maximum degree of substitution is 3 for each monomeric unit.

The terms "reaction", "reaction composition", and "esterification reaction" are used interchangeably herein and refer to a reaction comprising poly alpha-1,3-glucan, at least one acid catalyst, at least one acid anhydride and at least one organic acid. The reaction is substantially anhydrous. A reaction is placed under suitable conditions (e.g., time, temperature) for esterification of one or more hydroxyl groups of the glucose units of poly alpha-1,3-glucan with an acyl group from at least the acid anhydride or acid chloride, thereby yielding a poly alpha-1,3-glucan ester compound.

Herein, a poly alpha-1,3-glucan that is "acid-exchanged" has been treated with acid to remove water from the poly alpha-1,3-glucan. An acid-exchange process for producing acid-exchanged poly alpha-1,3-glucan can comprise one or more treatments in which the glucan is placed in an acid (e.g., organic acid) and then removed from the acid.

The term "acid catalyst" as used herein refers to any acid that accelerates progress of an esterification reaction. Examples of acid catalysts are inorganic acids such as sulfuric acid (H$_2$SO$_4$) and perchloric acid (HClO$_4$).

The term "acid anhydride" as used herein refers to an organic compound that has two acyl groups bound to the same oxygen atom. Typically, an acid anhydride herein has the formula (R—CO)$_2$O, where R is a saturated linear carbon chain (up to seven carbon atoms). Examples of acid anhydrides are acetic anhydride [(CH$_3$—CO)$_2$O], propionic anhydride [(CH$_3$—CH$_2$—CO)$_2$O] and butyric anhydride [(CH$_3$—CH$_2$—CH$_2$—CO)$_2$O].

The terms "organic acid" and "carboxylic acid" are used interchangeably herein. An organic acid has the formula R—COOH, where R is an organic group and COOH is a carboxylic group. The R group herein is typically a saturated linear carbon chain (up to seven carbon atoms). Examples of organic acids are acetic acid (CH$_3$—COOH), propionic acid (CH$_3$—CH$_2$—COOH) and butyric acid (CH$_3$—CH$_2$—CH$_2$—COOH).

The "molecular weight" of poly alpha-1,3-glucan and poly alpha-1,3-glucan ester compounds herein can be represented as number-average molecular weight ($M_n$) or as weight-average molecular weight ($M_w$). Alternatively, molecular weight can be represented as Daltons, grams/mole, DP$_W$ (weight average degree of polymerization), or DPn (number average degree of polymerization). Various means are known in the art for calculating these molecular weight measurements, such as high-performance liquid chromatography (HPLC), size exclusion chromatography (SEC), or gel permeation chromatography (GPC).

The terms "household care product", "home care product", and like terms typically refer to products, goods and services relating to the treatment, cleaning, caring, and/or conditioning of a home and its contents. The foregoing include, for example, chemicals, compositions, products, or combinations thereof having application in such care.

The term "personal care product" and like terms typically refer to products, goods and services relating to the treatment, cleaning, cleansing, caring, or conditioning of a person. The foregoing include, for example, chemicals, compositions, products, or combinations thereof having application in such care.

The term "industrial product" and like terms typically refer to products, goods and services used in industrial settings, but typically not by individual consumers.

Generally

Bio-sourced/bio-degradable polymers are in demand as a substitute for incumbent polymeric materials. Poly alpha-1,3-glucan is a biodegradable polysaccharide derived from enzymatic processes or fungi, for example, and can be economically made from renewable resource-based feedstocks. Poly alpha-1,3-glucan is a highly hydrogen bonded polymer that degrades before it melts, which prevents thermoprocessing, and in particular melt-processing, the polymer into articles. Melt-processing allows for the manufacturing of molded parts, fibers, films, and etc. without the use of solvents.

Cellulose, starch, and related polysaccharides can be made melt-processable by derivatizing them with ester functionalities. Melt-processable starch derivatives have poor mechanical properties due to the amylopectin content. Creating melt-processable cellulose derivatives requires significant up-stream processing to purify the cellulose and decrease the molecular weight to an extent such that the modification reactions can be performed.

Commercially, cellulose thermoplastics are prepared using acetic anhydride, propionic anhydride, butyric anhydride, and combinations thereof [acetic acid (or anhydride)] with propionic anhydride and acetic acid (or anhydride) with butyric anhydride to produce cellulose acetate, cellulose acetate propionate, and cellulose acetate butyrate. The reactivity of anhydrides decreases with increasing chain length and the cost of anhydrides increases as a function of chain length. The result is substitution with long chain esters (>4 carbon chains) is typically performed through alternative routes which are not commercially practical for cellulose.

Short-chain (<C4) cellulose esters typically need to be plasticized to lower the melt-viscosity to an extent that the materials can be melt-processed. While plasticizers can be used to tune the physical properties, e.g., increase elongation at break and impact strength at the expense of tensile strength and heat deflection temperature, issues such as leaching can have a profound effect on the polymer's performance over time. Many plasticizers, e.g., phthalates, have health concerns. Furthermore, cellulose and starch based-polymers are often plagued with water uptake and dimensional stability. These concerns have lead industry to look for polymers that don't require plasticizers.

A need exists for melt-processable poly alpha-1,3-glucan derivatives that can replace incumbent polymers used in melt-processing manufacturing and articles made therefrom. A need also exists for melt-processable poly alpha-1,3-glucan derivatives that overcome the performance deficiencies mentioned herein.

Applicants have discovered that poly alpha-1,3-glucan derivatives, and in particular, poly alpha-1,3-glucan ester derivatives, address the industry needs described herein.

Embodiments of poly alpha-1,3-glucan ester derivatives and articles made therefrom are disclosed herein.

Applicants have discovered poly alpha-1,3-glucan long-chain ester derivative compositions and poly alpha-1,3-glucan short-chain ester derivatives plus plasticizer compositions useful in melt-processes to make articles therefrom. The discovery includes the optimization of the ester functionalities, melt and flow characteristics, and plasticizer use which results in articles made therefrom having increased mechanical performance characteristics. Such articles are also transparent if no additional additives are present in the articles which could affect this transparency. Applicants' discoveries are disclosed herein.

Poly alpha-1,3-Glucan Ester Derivatives: Long-Chain Esters

Poly alpha-1,3-glucan ester derivatives useful in thermoprocesses such as melt-processes are disclosed herein. Also disclosed herein are poly alpha-1,3-glucan ester derivatives useful in injection molded parts.

Examples of poly alpha-1,3-glucan ester compounds/compositions include but are not limited to the structure below:

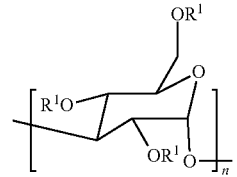

Regarding the formula of structure above, n may be at least 6, and each $R^1$ can independently be a H or an acyl group. Additionally, the poly alpha-1,3-glucan ester compound has a degree of substitution of about 0.001 to about 3.0.

The acyl group may be independently selected from the group consisting of acetyl; benzoyl;

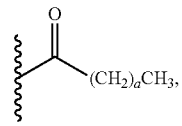

wherein a is independently 7-24; and,

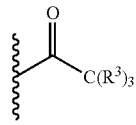

wherein $R^3$ can be independently selected from H atoms, linear alkyl groups, branched alkyl groups, cyclic alkyl groups, and aryl groups comprising from one to 24 carbon atoms. When $R^1$ is acetyl, then at least one other $R^1$ is benzoyl or

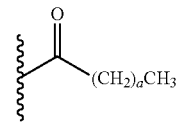

wherein a is independently 7-24.

In an embodiment, a may be independently 7-16. In another embodiment, a may be independently 9-16.

In an embodiment of acyl group

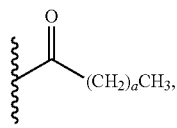

when a is 7-24, it encompasses the following acyl groups respectively: enanthyl, caprylyl, pelargonyl, capryl, undecanoyl, lauroyl, tridecanoyl, myristyl, pentadecanoyl, palmitoyl, heptadecanoyl stearyl, nonadecanoyl, arachidyl, uneicosanoyl, behenyl, trieicosanoyl, lignoceryl, pentaleicosanoyl, and cerotyl. In another embodiment, the carbon chain may be linear and comprise 7 to 26 carbons including the carbonyl (—CO—) carbon.

In another embodiment of acyl group

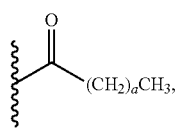

when a is 7-16 it encompasses the following acyl groups respectively: enanthyl, caprylyl, pelargonyl, capryl, undecanoyl, lauroyl, tridecanoyl, myristyl, pentadecanoyl, and palmitoyl, In another embodiment, the carbon chain may be linear and comprise 7 to 16 carbons including the carbonyl (—CO—) carbon.

In an embodiment of acyl group

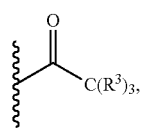

this acyl group can be 2-dimethylproprionyl or 2-ethylpropionyl.

In an embodiment, the acyl group may be a branched ester. Branching/substitution include, but are not limited to, alkyls and cyclic groups. In an embodiment, alkyl groups may include t-butyl, neo-pentyl, methyl, ethyl, and etc. In another embodiment, cyclic groups may include non-aromatic and aromatic groups such a phenyl, cyclohexane, and etc.

Poly alpha-1,3-glucan ester compounds as disclosed herein may contain one type of acyl group disclosed herein. For example, one or more $R^1$ groups ester-linked to the glucose group in the formula below

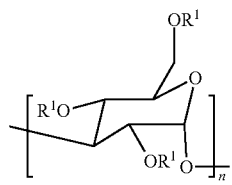

may be an enanthyl group; the $R^1$ groups in this particular example would thus independently be hydrogen and enanthyl groups. As another example, one or more $R^1$ groups ester-linked to the glucose group in the above formula may be a myristyl group; the $R^1$ groups in this particular example would thus independently be hydrogen and myristyl groups. As another example, one or more $R^1$ groups ester-linked to the glucose group in the above formula may be a lauroyl group; the $R^1$ groups in this particular example would thus independently be hydrogen and lauroyl groups. As another example, one or more $R^1$ groups ester-linked to the glucose group in the above formula may be a benzoyl group; the $R^1$ groups in this particular example would thus independently be hydrogen and benzoyl groups.

Alternatively, poly alpha-1,3-glucan ester compounds disclosed herein may contain two or more different types of acyl groups. Examples of such compounds contain two different acyl groups, such as (i) acetyl and lauryl groups (poly alpha-1,3-glucan acetate laurate, where $R^1$ groups are independently H, acetyl, or lauroyl), (ii) acetyl and palmitoyl groups (poly alpha-1,3-glucan acetate palmitate, where $R^1$ groups are independently H, acetyl, or palmitoyl).

Other embodiments of the two or more different types of acyl groups include those independently selected from the group consisting of acetyl, benzoyl, enanthyl, caprylyl, pelargonyl, capryl, undecanoyl, lauroyl, tridecanoyl, myristyl, pentadecanoyl, palmitoyl, heptadecanoyl stearyl, nonadecanoyl, arachidyl, uneicosanoyl, behenyl, trieicosanoyl, lignoceryl, pentaleicosanoyl, and cerotyl.

Poly alpha-1,3-Glucan Ester Derivatives:
Short-Chain Esters Plus Plasticizer

Examples of other poly alpha-1,3-glucan ester compositions include a poly alpha-1,3-glucan ester compound of the structure below and a plasticizer.

Examples of other poly alpha-1,3-glucan ester compounds include but are not limited to the structure below:

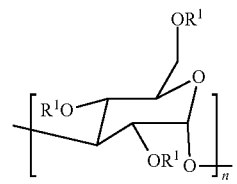

Regarding the formula of structure above, n may be at least 6, and each $R^1$ can independently be a H or an acyl group. Additionally, the poly alpha-1,3-glucan ester compound has a degree of substitution of about 0.3 to about 3.0.

The acyl group may be independently selected from the group consisting of acetyl; formyl; and

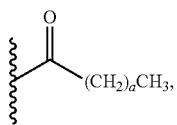

wherein a is independently 0-6 (or 1-6).

In an embodiment of acyl group

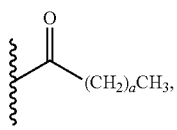

when a is 0-6, it encompasses the following acyl groups respectively: acetyl, propionyl, butyryl, valeryl, caproyl, enanthyl, and caprylyl. In another embodiment, the carbon chain may be linear and comprise 2 to 8 carbons including the carbonyl (—CO—) carbon.

In an embodiment, the acyl group may be a branched ester. Branching/substitution include, but are limited to alkyls and cyclic groups. In an embodiment, alkyl groups may include t-butyl, neo-pentyl, methyl, ethyl, and etc. In another embodiment, cyclic groups may include non-aromatic and aromatic groups such a phenyl, cyclohexane, and etc.

Poly alpha-1,3-glucan ester compounds as disclosed herein may contain one type of acyl group disclosed herein. For example, one or more $R^1$ groups ester-linked to the glucose group in the formula below

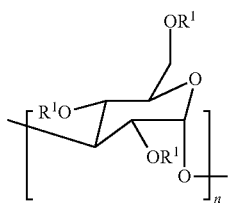

may be an acetyl group; the $R^1$ groups in this particular example would thus independently be hydrogen and acetyl groups. As another example, one or more $R^1$ groups ester-linked to the glucose group in the above formula may be a propionyl group; the $R^1$ groups in this particular example would thus independently be hydrogen and propionyl groups. As another example, one or more $R^1$ groups ester-linked to the glucose group in the above formula may be a butyryl group; the $R^1$ groups in this particular example would thus independently be hydrogen and butyryl groups.

Alternatively, poly alpha-1,3-glucan ester compounds disclosed herein may contain two or more different types of acyl groups. Examples of such compounds contain two different acyl groups, such as (i) acetyl and propionyl groups (poly alpha-1,3-glucan acetate proprionate, where $R^1$ groups are independently H, acetyl, or propionyl), (ii) formyl and propionyl groups (poly alpha-1,3-glucan formate propionate, where $R^1$ groups are independently H, acetyl, or propionyl).

Other embodiments of the two or more different types of acyl groups include those independently selected from the group consisting of acetyl, propionyl, butyryl, valeryl, caproyl, enanthyl, and caprylyl.

Plasticizers that may be used with the poly alpha-1,3-glucan ester compounds disclosed herein are selected from the group consisting of phthalate esters, phosphate esters, glycerol esters, triethylene glycol based esters, and esters of adipic acid, azelaic acid, citric acid, sebacic acid, and tartaric acid. Embodiments of plasticizers include but are not limited to triethyl citrate, diethyl phthalate, and bis(2-ethylhexyl) adipate.

The compositions disclosed herein may contain poly alpha-1,3-glucan ester compounds disclosed herein in a range from about 50 wt % to about 99 wt % and a plasticizer in a range from about 1 wt % to about 50 wt %. In particular embodiments, the ranges of poly alpha-1,3-glucan ester compounds and plasticizer respectively may be 80 wt % and 20 wt %; 90 wt % and 10 wt %; 95 wt % and 5 wt %; 98 wt % and 2 wt %; and 99 wt % and 1 wt %.

The poly alpha-1,3-glucan ester compounds disclosed herein have a degree of substitution (DoS) of about 0.001 to 3.0, preferably from about 0.3 to 3.0. The range encompasses poly alpha-1,3-glucan mono-ester compounds as well as mixed-ester compounds. Alternatively, the DoS of a poly alpha-1,3-glucan ester compound disclosed herein can be about 1.5 to about 3.0. In another alternative, the DoS maybe in a range from about 2.2 to about 2.9. Alternatively still, the DoS can be at least about 1.3, 1.4, 1.5, 1.6, 1.7, 1.8, 1.9, 2.0, 2.1, 2.2, 2.3, 2.4, 2.5, 2.6, 2.7, 2.8, 2.9, or 3.0. Such poly alpha-1,3-glucan esters can be a monoester or a mixed ester. It would be understood by those skilled in the art that since a poly alpha-1,3-glucan ester compound disclosed herein has a degree of substitution between about 0.3 (or 0.001) to about 3.0, the $R^1$ groups of the compound cannot only be hydrogen.

The percentage of glycosidic linkages between the glucose monomer units of the poly alpha-1,3-glucan ester compound that are alpha-1,3 is at least about 50%, 60%, 70%, 80%, 90%, 95%, 96%, 97%, 98%, 99%, or 100% (or any integer between 50% and 100%). In such embodiments, accordingly, the compound has less than about 50%, 40%, 30%, 20%, 10%, 5%, 4%, 3%, 2%, 1%, or 0% (or any integer value between 0% and 50%) of glycosidic linkages that are not alpha-1,3.

The backbone of a poly alpha-1,3-glucan ester compound disclosed herein is preferably linear/unbranched. In certain embodiments, the compound has no branch points or less than about 10%, 9%, 8%, 7%, 6%, 5%, 4%, 3%, 2%, or 1% branch points as a percent of the glycosidic linkages in the polymer. Examples of branch points include alpha-1,6 branch points.

The formula of a poly alpha-1,3-glucan ester compound in certain embodiments can have an n value of at least 6. Alternatively, n can have a value of at least 10, 50, 100, 200, 300, 400, 500, 600, 700, 800, 900, 1000, 1100, 1200, 1300, 1400, 1500, 1600, 1700, 1800, 1900, 2000, 2100, 2200, 2300, 2400, 2500, 2600, 2700, 2800, 2900, 3000, 3100, 3200, 3300, 3400, 3500, 3600, 3700, 3800, 3900, or 4000 (or any integer between 10 and 4000).

The molecular weight of a poly alpha-1,3-glucan ester compound disclosed herein can be measured as number-average molecular weight ($M_n$) or as weight-average molecular weight ($M_w$). Alternatively, molecular weight can be measured in Daltons or grams/mole. It may also be useful to refer to the $DP_w$ (weight average degree of polymerization) or DPn (number average degree of polymerization) of the poly alpha-1,3-glucan polymer component of the compound.

The $M_n$ or $M_w$ of poly alpha-1,3-glucan ester compounds disclosed herein may be at least about 1000. Alternatively, the $M_n$ or $M_w$ can be at least about 1000 to about 600000. Alternatively still, the $M_n$ or $M_w$ can be at least about 10000, 25000, 50000, 75000, 100000, 125000, 150000, 175000, 200000, 225000, 250000, 275000, 300000, 325000, 350000, 375000, 400000, 425000, or 500000 (or any integer between 10000 and 500000), for example.

Articles

Poly alpha-1,3-glucan ester compounds, and compositions comprising poly alpha-1,3-glucan ester compounds and plasticizers are useful in thermal processing methods to make articles. Thermal processing includes melt-processing methods such as extrusion, injection molding, and thermoforming.

Articles comprising poly alpha-1,3-glucan ester compounds, and poly alpha-1,3-glucan ester compositions disclosed herein include flexible packaging; rigid packaging; continuous, free-standing films; and articles made by extrusion molding or injection molding.

Films and other articles comprising poly alpha-1,3-glucan ester compounds herein may exhibit desirable transparency properties when measured according to ASTM D1003:13. The poly alpha-1,3-glucan ester compounds exhibit a total luminous transmittance ($T_t$) of at least 60 percent, preferably at least 70 percent, more preferably at least 80 percent, and most preferably at least 85 percent up to a maximum of about 99.5 percent.

Films and other articles comprising poly alpha-1,3-glucan ester compounds herein may also exhibit desirable haze properties when measured according to ASTM D1003:13. The poly alpha-1,3-glucan ester compounds exhibit a percent haze of 30 percent or less, preferably 25 percent or less, and more preferably less than 20 percent but greater than zero.

Examples of flexible packages include but are not limited to blister pack base, a strip pack base, a metal/plastic sheet, a paper/plastic laminate, a pouch, a wrap, and a bag.

Examples of methods to produce flexible packages from the materials listed above include, but are not limited to compression molding, cast film extrusion, and/or blown film extrusion. Embodiments of compression molding processes encompass processes that involve heating a polymer placed between metal plates or a mold to or above its melting temperature, applying pressure for short time periods (ranging from less than a minute to a few minutes), and allowing the polymer to solidify forming an article. If necessary, cycles can be included where pressure is released and applied repeatedly. Embodiments of cast extrusion encompass processes that involve heating a polymer to or above its melting temperature and extruding the polymer out of a flat die to form a film. In such processes, the film is often extruded onto a casting drum (or some similar conveying device) to allow the film article to properly solidify prior to wind-up onto a roller. Embodiments of blown extrusion encompasses processes that involve heating a polymer to or above its melting temperature and extruding the polymer out of a circular, hoop die to form a bubble that can be cooled or heated, if necessary, while suspended until it is nipped onto a roller as a film article.

Examples of rigid packages include but are not limited to bottles, jars, ready meal trays, trays, cosmetic containers, squeezable tubes, and thin wall containers. Application specific examples include, but are not limited to, trays used for meat or produce, and thin walled containers common as a secondary package in electronics and confectionaries.

Methods to produce rigid packaging from the poly alpha-1,3-glucan ester compounds, and poly alpha-1,3-glucan ester compositions disclosed herein (with or without plasticizers) include, but are not limited to, compression molding, thermoforming, and/or injection molding. Embodiments of compression molding processes encompass processes that involve heating a polymer placed between a mold to or above its melting temperature, applying pressure for short time periods (ranging from less than a minute to a few minutes), and allowing the polymer to solidify forming an article in the shape of a mold. Cycles can be included where pressure is released and applied repeatedly, if needed. Embodiments of thermoforming processes encompass processes that involve heating a sheet of polymer until it can be deformed and subsequently forming the sheet into an article in the shape of a mold typically using a change in pressure such as vacuum or pressure increase where it can cool to maintain the desired mold shape. Embodiments of injection molding processes encompass processes that involve heating a polymer to or above its melting temperature and applying a pressure to push the polymer into a mold where it can solidify to form an article in the shape of the mold.

The continuous, free standing, melt-processable films can be made by methods to that include but are not limited to compression molding, cast extrusion, and/or blown extrusion, as described in the flexible packaging section. Non-melt-processable free-standing films can also be prepared through solvent cast methods.

Articles than can be made by injection molding include any article comprising poly alpha-1,3-glucan ester compounds, and poly alpha-1,3-glucan ester compositions disclosed herein. Embodiments of injection molding processes encompass processes that involve heating a polymer to its melting temperature and applying pressure to force the molten polymer into a mold where it cools and solidifies, taking the shape of the mold.

Additional applications of poly alpha-1,3-glucan ester compounds and poly alpha-1,3-glucan ester compositions disclosed herein include, but are not limited to, meltspun filament and staple fibers for textile, apparel and nonwoven applications, meltblown nonwovens for hygiene, technical and medical applications, melt and hotmelt adhesives and sealants.

Continuous fibers, or yarns can be prepared by a so-called melt spinning process, and are said to be "melt spun". Melt spinning is a process whereby the polymer is melted and extruded through a hole in a so-called spinneret. In typical textile applications, the spinneret is provided with a plurality of holes, often in the range from 1-2000, each about 0.25 mm in diameter, as typical example. Multiple filaments are thereby extruded from a single spinneret. The melt spun filaments thereby produced are collected in a manner consistent with the desired end use. For example, filament intended for use in continuous form, such as in texturing, is typically wound on a yarn, packaged and mounted on a tension-controlled wind-up. Filaments may be otherwise treated in orientation or texturing as practiced in the industry. In addition, staple fibers may be used as blend fibers with other fibers such as cotton, polyester or mixtures. In addition, other fiber formats such as broad continuous fibers may be produced, as used for example in the manufacture of carpet yarns.

Staple fibers can be prepared by melt spinning a suitable composition into filaments, quenching the filaments, drawing the quenched filaments, crimping the drawn filaments, and cutting the filaments into staple fibers having a length of 0.2 to 6 inches (0.5 to 15 cm).

Nonwoven fabric is a fabric-like material made from fibers bonded together by chemical, mechanical, heat or solvent treatment. Nonwoven fabrics are broadly defined as sheet or web structures bonded together by entangling fiber or filaments (and by perforating films) mechanically, thermally or chemically. They are flat or tufted porous sheets that are made directly from separate fibers, molten plastic or plastic film. They are not made by weaving or knitting and do not require converting the fibers to yarn. Typically, a certain percentage of recycled fabrics and oil-based materials are used in nonwoven fabrics. The percentage of recycled fabrics vary based upon the strength of material needed for the specific use. In addition, some nonwoven fabrics can be recycled after use, given the proper treatment and facilities. For this reason, some consider nonwovens a more ecological fabric for certain applications, especially in fields and industries where disposable or single use products are important, such as hospitals, schools, nursing homes and luxury accommodations. Especially for these applications the compositions of this invention may provide renewable, compostable and inherently biodegradable nonwoven structures with an improved environmental footprint.

Nonwoven fabrics are engineered fabrics that may have a limited life, single-use fabric or a very durable fabric. Nonwoven fabrics provide specific functions such as absorbency, liquid repellence, resilience, stretch, softness, strength, flame retardancy, washability, cushioning, thermal insulation, acoustic insulation, filtration, use as a bacterial barrier and sterility. These properties are often combined to create fabrics suited for specific jobs, while achieving a good balance between product use-life and cost. They can mimic the appearance, texture and strength of a woven fabric and can be as bulky as the thickest paddings. In combination with other materials they provide a spectrum of products with diverse properties, and are used alone or as components of apparel, home furnishings, health care, engineering, industrial and consumer goods.

Non-woven materials are used in numerous applications, including: Medical uses such as isolation gowns, surgical gowns, surgical drapes and covers, surgical masks, surgical scrub suits, caps, medical packaging: porosity allows gas sterilization, gloves, shoe covers, bath wipes, wound dressings; Filter uses such as gasoline, oil and air, water, coffee, tea bags, pharmaceutical industry, mineral processing, liquid cartridge and bag filters, vacuum bags, allergen membranes or laminates with nonwoven layers. Hygiene uses of such materials include uses as wipe materials, as backsheet materials for hygiene products such as pads, diapers or cloths. Sanitary products include baby and child hygiene products, female hygiene products, incontinence products, pads, absorbing pads, wiping cloths. Nonwoven materials may be used in geotextile and agricultural applications to manage erosion, weed growth, the application of water and reagents and the overall growth management or soil management, biodegradable structures may provide a special advantage in these applications.

Meltblown nonwovens are produced by extruding melted polymer fibers through a spin net or die consisting of typical multiple dies with 35-50 holes per inch to form long thin fibers which are stretched and cooled by passing hot air over the fibers as they fall from the die. The resultant web is collected into rolls and subsequently converted to finished products. The fibers differ from other extrusions, particularly spun bond, in that they have low intrinsic strength but much smaller size offering key properties. Often melt blown is added to spun bond to form SM (spun-melt) or SMS (spun-melt-spun) webs, which are strong and offer the intrinsic benefits of fine fibers such as fine filtration, low pressure drop as used in face masks or filters and physical benefits such as acoustic insulation as used in dishwashers.

Hot melt adhesive (HMA), also known as hot glue, is a form of thermoplastic adhesive that is commonly supplied in solid cylindrical sticks of various diameters, designed to be melted in an electric hot glue gun. The gun uses a continuous-duty heating element to melt the plastic glue, which the user pushes through the gun either with a mechanical trigger mechanism on the gun, or with direct finger pressure. The glue squeezed out of the heated nozzle is initially hot enough to burn and even blister skin. The glue is tacky when hot, and solidifies in a few seconds to one minute. Hot melt adhesives can also be applied by dipping or spraying.

In industrial use, hot melt adhesives (HMAs) provide several advantages over solvent-based adhesives. Volatile organic compounds are reduced or eliminated, and the drying or curing step is eliminated. Hot melt adhesives have long shelf life and usually can be disposed of without special precautions. Some of the disadvantages involve thermal load of the substrate, limiting use to substrates not sensitive to higher temperatures, and loss of bond strength at higher temperatures, up to complete melting of the adhesive. This can be reduced by using a reactive adhesive that after solidifying undergoes further curing e.g., by moisture (e.g., reactive urethanes and silicones), or is cured by ultraviolet radiation. Some HMAs may not be resistant to chemical attacks and weathering. HMAs do not lose thickness during solidifying; solvent-based adhesives may lose up to 50-70% of layer thickness during drying.

A sealant is a substance used to block the passage of fluids through the surface or
joints or openings in materials, a type of mechanical seal. In building construction sealant is sometimes synonymous with caulking and also serve the purposes of blocking dust, sound and heat transmission. Sealants may be weak or strong, flexible or rigid, permanent or temporary. Sealants are not adhesives but some have adhesive qualities and are called adhesive-sealants or structural sealants.

Sealants, despite not having great strength, convey a number of properties. They seal top structures to the substrate, and are particularly effective in waterproofing processes by keeping moisture out (or in) the components in which they are used. They can provide thermal and acoustical insulation, and may serve as fire barriers. They may have electrical properties, as well. Sealants can also be used for simple smoothing or filling. They are often called upon to perform several of these functions at once.

Additional Embodiments

A composition disclosed herein comprising a poly alpha-1,3-glucan ester compound, with or without a plasticizer, can be a personal care product, pharmaceutical product, household product, or industrial product in some aspects. Any feature as presently disclosed, such as for an article, film, package (rigid or flexible), can optionally also characterize, as appropriate, a personal care product, pharmaceutical product, household product, or industrial product. Examples of a concentration or amount of a poly alpha-1, 3-glucan ester compound in a product, on a weight basis, can be about 0.1-3 wt %, 1-2 wt %, 1.5-2.5 wt %, 2.0 wt %, 0.1-4 wt %, 0.1-5 wt %, or 0.1-10 wt %, for example.

A household and/or industrial product herein can be in the form of drywall tape-joint compounds; mortars; grouts; cement plasters; spray plasters; cement stucco; adhesives; pastes; wall/ceiling texturizers; binders and processing aids for tape casting, extrusion forming, injection molding and ceramics; spray adherents and suspending/dispersing aids for pesticides, herbicides, and fertilizers; hard surface cleaners; air fresheners; polymer emulsions; gels such as water-based gels; surfactant solutions; paints such as water-based paints; protective coatings; adhesives; sealants and caulks; inks such as water-based ink; metal-working fluids; emulsion-based metal cleaning fluids used in electroplating, phosphatizing, galvanizing and/or general metal cleaning operations; hydraulic fluids (e.g., those used for fracking in downhole operations); and aqueous mineral slurries, for example.

A composition comprising a poly alpha-1,3-glucan ester compound as disclosed herein can be non-aqueous (e.g., a dry composition). Examples of such embodiments include films, coatings, powders, granules, microcapsules, flakes, or any other form of particulate matter. Other examples include larger compositions such as pellets, bars, kernels, beads, tablets, capsules, beads or pastilles, sticks, or other agglomerates. A non-aqueous or dry composition herein can typically has less than 3, 2, 1, 0.5, or 0.1 wt % water comprised therein. The amount of poly alpha-1,3-glucan ester compound in a non-aqueous or dry composition can be about, or at least about, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 99.5, or 99.9 wt %, for example. A non-aqueous composition herein can be in the form of a household product, personal care product, pharmaceutical product, or industrial product, for example.

Depending upon the desired application, a poly alpha-1,3-glucan ester compound as disclosed herein can be formulated, for example, blended, mixed, or incorporated into, with one or more other materials and/or active ingredients suitable for use in various compositions, for example compositions for use in industrial, laundry care, textile/fabric care, and/or personal care products. A composition comprising a poly alpha-1,3-glucan ester in this context may include, for example, industrial products, aqueous formulations, rheology modifying compositions, fabric treatment/care compositions, laundry care formulations/compositions, fabric softeners or personal care compositions (hair, skin and oral care), each comprising a poly alpha-1,3-glucan ester as disclosed herein.

As used herein, the term "effective amount" refers to the amount of the substance used or administered that is suitable to achieve the desired effect. The effective amount of material may vary depending upon the application. One of skill in the art will typically be able to determine an effective amount for a particular application or subject without undo experimentation.

The term "resistance to enzymatic hydrolysis" refers to the relative stability of the poly alpha-1,3-glucan ester compound to enzymatic hydrolysis. Having a resistance to hydrolysis is important for the use of these materials in applications wherein enzymes are present, such as in detergent, fabric care, and/or laundry care applications. In some embodiments, a poly alpha-1,3-glucan ester is resistant to cellulases, proteases, amylases, lipases, or mannanases. In some embodiments, a poly alpha-1,3-glucan ester is resistant to multiple classes of enzymes, for example, two or more cellulases, proteases, amylases, lipases, mannanases, or combinations thereof. Resistance to any particular enzyme will be defined as having at least 10, 20, 30, 40, 50, 60, 70, 80, 90, 95 or 100% of the materials remaining after treatment with the respective enzyme. The percentage remaining may be determined by measuring the supernatant after enzyme treatment using SEC-HPLC.

The phrase "aqueous composition" herein refers to a solution or mixture in which the solvent is at least about 1% by weight of water and which comprises a poly alpha-1,3-glucan ester compound.

The terms "hydrocolloid" and "hydrogel" are used interchangeably herein. A hydrocolloid refers to a colloid system in which water is the dispersion medium. A "colloid" herein refers to a substance that is microscopically dispersed throughout another substance. Therefore, a hydrocolloid herein can also refer to a dispersion, emulsion, mixture, or solution of a poly alpha-1,3-glucan ester compound in water or aqueous solution.

The term "aqueous solution" herein refers to a solution in which the solvent is water. A poly alpha-1,3-glucan ester can be dispersed, mixed, and/or dissolved in an aqueous solution. An aqueous solution can serve as the dispersion medium of a hydrocolloid herein.

The terms "dispersant" and "dispersion agent" are used interchangeably herein to refer to a material that promotes the formation and stabilization of a dispersion of one substance in another. A "dispersion" herein refers to an aqueous composition comprising one or more particles, for example, any ingredient of a personal care product, pharmaceutical product, food product, household product or industrial product that are scattered, or uniformly distributed, throughout the aqueous composition. It is believed that a poly alpha-1,3-glucan ester can act as dispersants in aqueous compositions disclosed herein.

The term "viscosity" as used herein refers to the measure of the extent to which a fluid or an aqueous composition such as a hydrocolloid resists a force tending to cause it to flow. Various units of viscosity that can be used herein include centipoise (cPs) and Pascal-second (Pa·s). A centipoise is one one-hundredth of a poise; one poise is equal to $0.100$ kg·m$^{-1}$·s$^{-1}$. Thus, the terms "viscosity modifier" and "viscosity-modifying agent" as used herein refer to anything that can alter/modify the viscosity of a fluid or aqueous composition.

The terms "fabric", "textile", and "cloth" are used interchangeably herein to refer to a woven or non-woven material having a network of natural and/or artificial fibers. Such fibers can be thread or yarn, for example.

A "fabric care composition" herein is any composition suitable for treating fabric in some manner. Suitable examples of such a composition include non-laundering fiber treatments (for desizing, scouring, mercerizing, bleaching, coloration, dying, printing, bio-polishing, anti-microbial treatments, anti-wrinkle treatments, stain resistance treatments, etc.), laundry care compositions (e.g., laundry care detergents), and fabric softeners.

The terms "detergent composition", "heavy duty detergent" and "all-purpose detergent" are used interchangeably herein to refer to a composition useful for regular washing of a substrate, for example, dishware, cutlery, vehicles, fabrics, carpets, apparel, white and colored textiles at any temperature. Detergent compositions for treating of fabrics, hard surfaces and any other surfaces in the area of fabric and home care, include: laundry detergents, fabric conditioners (including softeners), laundry and rinse additives and care compositions, fabric freshening compositions, laundry prewash, laundry pretreat, hard surface treatment compositions, car care compositions, dishwashing compositions (including hand dishwashing and automatic dishwashing products), air care products, detergent contained on or in a porous substrate or nonwoven sheet, and other cleaner products for consumer or institutional use.

The terms "cellulase" and "cellulase enzyme" are used interchangeably herein to refer to an enzyme that hydrolyzes β-1,4-D-glucosidic linkages in cellulose, thereby partially or completely degrading cellulose. Cellulase can alternatively be referred to as "β-1,4-glucanase", for example, and can have endocellulase activity (EC 3.2.1.4), exocellulase activity (EC 3.2.1.91), or cellobiase activity (EC 3.2.1.21). A cellulase in certain embodiments herein can also hydrolyze β-1,4-D-glucosidic linkages in cellulose ether derivatives such as carboxymethyl cellulose. "Cellulose" refers to an insoluble polysaccharide having a linear chain of β-1,4-linked D-glucose monomeric units.

As used herein, the term "fabric hand" or "handle" is meant people's tactile sensory response towards fabric which may be physical, physiological, psychological, social or any combination thereof. In some embodiments, the fabric hand may be measured using a PHABROMETER® System (available from Nu Cybertek, Inc. Davis, California) for measuring the relative hand value as given by the American Association of Textile Chemists and Colorists (AATCC test method "202-2012, Relative Hand Value of Textiles: Instrumental Method").

A composition herein can be in the form of a liquid, a gel, a powder, a hydrocolloid, an aqueous solution, a granule, a tablet, a capsule, a bead or pastille, a single compartment sachet, a multi-compartment sachet, a single compartment pouch, or a multi-compartment pouch. In some embodiments, the composition is in the form of a liquid, a gel, a powder, a single compartment sachet, or a multi-compartment sachet.

In some embodiments, compositions comprising a poly alpha-1,3-glucan ester as disclosed herein can be in the form of a fabric care composition. A fabric care composition can be used for hand wash, machine wash and/or other purposes such as soaking and/or pretreatment of fabrics, for example. A fabric care composition may take the form of, for example, a laundry detergent; fabric conditioner; any wash-, rinse-, or dryer-added product; unit dose or spray. Fabric care compositions in a liquid form may be in the form of an aqueous composition. In other embodiments, a fabric care composition can be in a dry form such as a granular detergent or dryer-added fabric softener sheet. Other non-limiting examples of fabric care compositions can include: granular or powder-form all-purpose or heavy-duty washing agents; liquid, gel or paste-form all-purpose or heavy-duty washing agents; liquid or dry fine-fabric (e.g. delicates) detergents; cleaning auxiliaries such as bleach additives, "stain-stick", or pre-treatments; substrate-laden products such as dry and wetted wipes, pads, or sponges; sprays and mists; water-soluble unit dose articles.

In some embodiments, compositions comprising a poly alpha-1,3-glucan ester can be in the form of a personal care product. Personal care products include, but are not limited to, hair care compositions, skin care compositions, sun care compositions, body cleanser compositions, oral care compositions, wipes, beauty care compositions, cosmetic compositions, antifungal compositions, and antibacterial compositions. The personal care products can include cleansing, cleaning, protecting, depositing, moisturizing, conditioning, occlusive barrier, and emollient compositions.

As used herein, "personal care products" also includes products used in the cleaning, bleaching and/or disinfecting of hair, skin, scalp, and teeth, including, but not limited to shampoos, body lotions, shower gels, topical moisturizers, toothpaste, toothgels, mouthwashes, mouthrinses, antiplaque rinses, and/or other topical cleansers. In some embodiments, these products are utilized on humans, while in other embodiments, these products find use with non-human animals (e.g., in veterinary applications). In one aspect, "personal care products" includes hair care products. The hair care product can be in the form of a powder, paste, gel, liquid, oil, ointment, spray, foam, tablet, a hair shampoo, a hair conditioner rinse or any combination thereof.

The product formulation comprising a poly alpha-1,3-glucan ester described herein may be optionally diluted with water, or a solution predominantly comprised of water, to produce a formulation with the desired poly alpha-1,3-glucan ester concentration for the target application.

The personal care compositions described herein may further comprise one or more dermatologically or cosmetically acceptable components known or otherwise effective for use in hair care or other personal care products, provided that the optional components are physically and chemically compatible with the essential components described herein, or do not otherwise unduly impair product stability, aesthetics, or performance. Non-limiting examples of such optional components are disclosed in International Cosmetic Ingredient Dictionary, Ninth Edition, 2002, and CTFA Cosmetic Ingredient Handbook, Tenth Edition, 2004.

In one embodiment, the dermatologically acceptable carrier may comprise from about 10 wt % to about 99.9 wt %, alternatively from about 50 wt % to about 95 wt %, and alternatively from about 75 wt % to about 95 wt %, of a dermatologically acceptable carrier. Carriers suitable for use with the composition(s) may include, for example, those used in the formulation of hair sprays, mousses, tonics, gels, skin moisturizers, lotions, and leave-on conditioners. The carrier may comprise water; organic oils; silicones such as volatile silicones, amino or non-amino silicone gums or oils, and mixtures thereof; mineral oils; plant oils such as olive oil, castor oil, rapeseed oil, coconut oil, wheatgerm oil, sweet almond oil, avocado oil, macadamia oil, apricot oil, safflower oil, candlenut oil, false flax oil, tamanu oil, lemon oil and mixtures thereof; waxes; and organic compounds such as $C_2$-$C_{10}$ alkanes, acetone, methyl ethyl ketone, volatile organic $C_1$-$C_{12}$ alcohols, esters (with the understanding that the choice of ester(s) may be dependent on whether or not it may act as a carboxylic acid ester substrates for the perhydrolases) of $C_1$-$C_{20}$ acids and of $C_1$-$C_8$ alcohols such as methyl acetate, butyl acetate, ethyl acetate, and isopropyl myristate, dimethoxyethane, diethoxyethane, $C_{10}$-$C_{30}$ fatty alcohols such as lauryl alcohol, cetyl alcohol, stearyl alcohol, and behenyl alcohol; $C_{10}$-$C_{30}$ fatty acids such as lauric acid and stearic acid; $C_{10}$-$C_{30}$ fatty amides such as lauric diethanolamide; $C_{10}$-$C_{30}$ fatty alkyl esters such as $C_{10}$-$C_{30}$ fatty alkyl benzoates; hydroxypropylcellulose, and mixtures thereof. In one embodiment, the carrier comprises water, fatty alcohols, volatile organic alcohols, and mixtures thereof.

The composition(s) disclosed herein further may comprise from about 0.1% to about 10%, and alternatively from about 0.2% to about 5.0%, of a gelling agent to help provide the desired viscosity to the composition(s). Non-limiting examples of suitable optional gelling agents include crosslinked carboxylic acid polymers; unneutralized crosslinked carboxylic acid polymers; unneutralized modified crosslinked carboxylic acid polymers; crosslinked ethylene/maleic anhydride copolymers; unneutralized crosslinked ethylene/maleic anhydride copolymers (e.g., EMA 81 commercially available from Monsanto); unneutralized crosslinked alkyl ether/acrylate copolymers (e.g., SALCARE™ SC90 commercially available from Allied Colloids); unneutralized crosslinked copolymers of sodium polyacrylate, mineral oil, and PEG-1 trideceth-6 (e.g., SALCARE™ SC91 commercially available from Allied Colloids); unneutralized crosslinked copolymers of methyl vinyl ether and maleic anhydride (e.g., STABILEZE™ QM-PVM/MA copolymer commercially available from International Specialty Products); hydrophobically modified nonionic cellulose polymers; hydrophobically modified ethoxylate urethane polymers (e.g., UCARE™ Polyphobe Series of alkali swellable polymers commercially available from Union Carbide); and combinations thereof. In this context, the term "unneutralized" means that the optional polymer and copolymer gelling agent materials contain unneutralized acid monomers. Preferred gelling agents include water-soluble unneutralized crosslinked ethylene/maleic anhydride copolymers, water-soluble unneutralized crosslinked carboxylic acid polymers, water-soluble hydrophobically modified nonionic cellulose polymers and surfactant/fatty alcohol gel networks such as those suitable for use in hair conditioning products.

The poly alpha-1,3-glucan ester compounds described herein may be incorporated into hair care compositions and products, such as but not limited to, hair conditioning agents. Hair conditioning agents are well known in the art, see for example Green et al. (WO 0107009), and are available commercially from various sources. Suitable examples of hair conditioning agents include, but are not limited to, cationic polymers, such as cationized guar gum, diallyl quaternary ammonium salt/acrylamide copolymers, quaternized polyvinylpyrrolidone and derivatives thereof, and various polyquaternium-compounds; cationic surfactants, such as stearalkonium chloride, centrimonium chloride, and sapamin hydrochloride; fatty alcohols, such as behenyl alcohol; fatty amines, such as stearyl amine; waxes; esters; nonionic polymers, such as polyvinylpyrrolidone, polyvinyl alcohol, and polyethylene glycol; silicones; siloxanes, such as decamethylcyclopentasiloxane; polymer emulsions, such as amodimethicone; and nanoparticles, such as silica nanoparticles and polymer nanoparticles.

The hair care products may also include additional components typically found in cosmetically acceptable media. Non-limiting examples of such components are disclosed in International Cosmetic Ingredient Dictionary, Ninth Edition, 2002, and CTFA Cosmetic Ingredient Handbook, Tenth Edition, 2004. A non-limiting list of components often included in a cosmetically acceptable medium for hair care are also described by Philippe et al. in U.S. Pat. No. 6,280,747, and by Omura et al. in U.S. Pat. No. 6,139,851 and Cannell et al. in U.S. Pat. No. 6,013,250, all of which are incorporated herein by reference. For example, hair care compositions can be aqueous, alcoholic or aqueous-alcoholic solutions, the alcohol preferably being ethanol or isopropanol, in a proportion of from about 1 to about 75% by weight relative to the total weight, for the aqueous-alcoholic solutions. Additionally, the hair care compositions may contain one or more conventional cosmetic or dermatological additives or adjuvants including but not limited to, antioxidants, preserving agents, fillers, surfactants, UVA and/or UVB sunscreens, fragrances, thickeners, gelling agents, wetting agents and anionic, nonionic or amphoteric polymers, and dyes or pigments.

The hair care compositions and methods may also include at least one coloring agents such as any dye, lake, pigment, and the like that may be used to change the color of hair, skin, or nails. Hair coloring agents are well known in the art (see for example Green et al. supra, *CFTA International Color Handbook*, 2$^{nd}$ ed., Micelle Press, England (1992) and *Cosmetic Handbook*, US Food and Drug Administration, FDA/IAS Booklet (1992)), and are available commercially from various sources (for example Bayer, Pittsburgh, PA; Ciba-Geigy, Tarrytown, NY; ICI, Bridgewater, NJ; Sandoz, Vienna, Austria; BASF, Mount Olive, NJ; and Hoechst, Frankfurt, Germany). Suitable hair coloring agents include, but are not limited to dyes, such as 4-hydroxypropylamino-3-nitrophenol, 4-amino-3-nitrophenol, 2-amino-6-chloro-4-nitrophenol, 2-nitro-paraphenylenediamine, N,N-hydroxyethyl-2-nitro-phenylenediamine, 4-nitro-indole, Henna, HC Blue 1, HC Blue 2, HC Yellow 4, HC Red 3, HC Red 5, Disperse Violet 4, Disperse Black 9, HC Blue 7, HC Blue 12, HC Yellow 2, HC Yellow 6, HC Yellow 8, HC Yellow 12, HC Brown 2, D&C Yellow 1, D&C Yellow 3, D&C Blue 1, Disperse Blue 3, Disperse violet 1, eosin derivatives such as D&C Red No. 21 and halogenated fluorescein derivatives such as D&C Red No. 27, D&C Red Orange No. 5 in combination with D&C Red No. 21 and D&C Orange No. 10; and pigments, such as D&C Red No. 36 and D&C Orange No. 17, the calcium lakes of D&C Red Nos. 7, 11, 31 and 34, the barium lake of D&C Red No. 12, the strontium lake of D&C Red No. 13, the aluminum lakes of FD&C Yellow No. 5, of FD&C Yellow No. 6, of D&C Red No. 27, of D&C Red No. 21, and of FD&C Blue No. 1, iron oxides, manganese violet, chromium oxide, titanium dioxide, titanium dioxide nanoparticles, zinc oxide, barium oxide, ultramarine blue, bismuth citrate, and carbon black particles. In one embodiment, the hair coloring agents are D&C Yellow 1 and 3, HC Yellow 6 and 8, D&C Blue 1, HC Blue 1, HC Brown 2, HC Red 5, 2-nitro-paraphenylenediamine, N,N-hydroxyethyl-2-nitro-phenylenediamine, 4-nitro-indole, and carbon black. Metallic and semiconductor nanoparticles may also be used as hair coloring agents due to their strong emission of light (U.S. Patent Application Publication No. 2004-0010864 to Vic et al.). Hair care compositions may include, but are not limited to, shampoos, conditioners, lotions, aerosols, gels, mousses, and hair dyes.

Personal care products may be in the form of lotions, creams, pastes, balms, ointments, pomades, gels, liquids, or combinations thereof. A personal care product can also be in the form of makeup, lipstick, mascara, rouge, foundation, blush, eyeliner, lip liner, lip gloss, other cosmetics, sunscreen, sun block, nail polish, mousse, hair spray, styling gel, nail conditioner, bath gel, shower gel, body wash, face wash, shampoo, hair conditioner (leave-in or rinse-out), cream rinse, hair dye, hair coloring product, hair shine product, hair serum, hair anti-frizz product, hair split-end repair product, lip balm, skin conditioner, cold cream, moisturizer, body spray, soap, body scrub, exfoliant, astringent, scruffing lotion, depilatory, permanent waving solution, anti-dandruff formulation, antiperspirant composition, deodorant, shaving product, pre-shaving product, after-shaving product, cleanser, skin gel, rinse, dentifrice composition, toothpaste, or mouthwash, for example.

Personal care products can include a poly alpha-1,3-glucan ester as disclosed herein, and can further comprise personal care active ingredient materials including sun screen agents, moisturizers, humectants, benefiting agents for hair, skin, nails and mouth, depositing agents such as surfactants, occlusive agents, moisture barriers, lubricants, emollients, anti-aging agents, antistatic agents, abrasive, antimicrobials, conditioners, exfoliants, fragrances, viscosifying agents, salts, lipids, phospholipids, vitamins, foam stabilizers, pH modifiers, preservatives, suspending agents, silicone oils, silicone derivatives, essential oils, oils, fats, fatty acids, fatty acid esters, fatty alcohols, waxes, polyols, hydrocarbons, and mixtures thereof. An active ingredient is generally recognized as an ingredient that causes an intended pharmacological effect.

In certain embodiments, a skin care product can include at least one active ingredient for the treatment or prevention of skin ailments, providing a cosmetic effect, or for providing a moisturizing benefit to skin, such as zinc oxide, petrolatum, white petrolatum, mineral oil, cod liver oil, lanolin, dimethicone, hard fat, vitamin A, allantoin, calamine, kaolin, glycerin, or colloidal oatmeal, and combinations of these. A skin care product may include one or more natural moisturizing factors such as ceramides, hyaluronic acid, glycerin, squalane, amino acids, cholesterol, fatty acids, triglycerides, phospholipids, glycosphingolipids, urea, linoleic acid, glycosaminoglycans, mucopolysaccharide, sodium lactate, or sodium pyrrolidone carboxylate, for example. Other ingredients that may be included in a skin care product include, without limitation, glycerides, apricot kernel oil, canola oil, squalane, squalene, coconut oil, corn oil, jojoba oil, jojoba wax, lecithin, olive oil, safflower oil, sesame oil, shea butter, soybean oil, sweet almond oil, sunflower oil, tea tree oil, shea butter, palm oil, cholesterol, cholesterol esters, wax esters, fatty acids, and orange oil.

Various examples of personal care formulations comprising at least one poly alpha-1,3-glucan ester herein are disclosed below (1-3).

(1) A hair conditioner composition comprising: cetyl alcohol (1-3%), isopropyl myristate (1-3%), hydroxyethyl cellulose (Natrosol® 250 HHR), 0.1-1%, poly alpha-1,3-glucan ester (0.1-2%), potassium salt (0.1-0.5%), Germaben® II preservative (0.5%, available from International Specialty Products), and the balance being water.

(2) A hair shampoo composition comprising: 5-20% sodium laureth sulfate, 1-2 wt % cocamidopropyl betaine, 1-2 wt % sodium chloride, 0.1-2% poly alpha-1,3-glucan ester, preservative (0.1-0.5%), and the balance being water.

(3) A skin lotion composition comprising: 1-5% glycerin, 1-5% glycol stearate, 1-5% stearic acid, 1-5% mineral oil, 0.5-1% acetylated lanolin (Lipolan® 98), 0.1-0.5 cetyl alcohol, 0.2-1% triethanolamine, 0.1-1 wt % Germaben® II preservative, 0.5-2 wt % poly alpha-1,3-glucan ester, and the balance being water.

Personal care compositions disclosed herein can be in the form of an oral care composition. Examples of oral care compositions include dentifrices, toothpaste, mouth wash, mouth rinse, chewing gum, and edible strips that provide some form of oral care (e.g., treatment or prevention of cavities [dental caries], gingivitis, plaque, tartar, and/or periodontal disease). An oral care composition can also be for treating an "oral surface", which encompasses any soft or hard surface within the oral cavity including surfaces of the tongue, hard and soft palate, buccal mucosa, gums and dental surfaces. A "dental surface" herein is a surface of a natural tooth or a hard surface of artificial dentition including a crown, cap, filling, bridge, denture, or dental implant, for example.

One or more poly alpha-1,3-glucan esters comprised in an oral care composition typically are provided therein as a thickening agent and/or dispersion agent, which may be useful to impart a desired consistency and/or mouth feel to the composition. An oral care composition herein can comprise about 0.01-15.0 wt % (e.g., ~0.1-10 wt % or ~0.1-5.0 wt %, ~0.1-2.0 wt %) of one or more poly alpha-1,3-glucan esters disclosed herein. One or more other thickening agents or dispersion agents can also be provided in an oral care composition herein, such as a carboxyvinyl polymer, carrageenan (e.g., L-carrageenan), natural gum (e.g., karaya, xanthan, gum arabic, tragacanth), colloidal magnesium aluminum silicate, or colloidal silica, for example.

An oral care composition herein may be a toothpaste or other dentifrice, for example. Such compositions, as well as any other oral care composition herein, can additionally comprise, without limitation, one or more of an anticaries agent, antimicrobial or antibacterial agent, anticalculus or tartar control agent, surfactant, abrasive, pH-modifying agent, foam modulator, humectant, flavorant, sweetener, pigment/colorant, whitening agent, and/or other suitable components.

An anticaries agent herein can be an orally acceptable source of fluoride ions. Suitable sources of fluoride ions include fluoride, monofluorophosphate and fluorosilicate salts as well as amine fluorides, including olaflur (N'-octadecyltrimethylendiamine-N,N,N'- tris(2-ethanol)-dihydrofluoride), for example. An anticaries agent can be present in an amount providing a total of about 100-20000 ppm, about 200-5000 ppm, or about 500-2500 ppm, fluoride ions to the composition, for example. In oral care compositions in which sodium fluoride is the sole source of fluoride ions, an amount of about 0.01-5.0 wt %, about 0.05-1.0 wt %, or about 0.1-0.5 wt %, sodium fluoride can be present in the composition, for example.

An antimicrobial or antibacterial agent suitable for use in an oral care composition herein includes, for example, phenolic compounds (e.g., 4-allylcatechol; p-hydroxybenzoic acid esters such as benzylparaben, butylparaben, ethylparaben, methylparaben and propylparaben; 2-benzylphenol; butylated hydroxyanisole; butylated hydroxytoluene; capsaicin; carvacrol; creosol; eugenol; guaiacol; halogenated bisphenolics such as hexachlorophene and bromochlorophene; 4-hexylresorcinol; 8-hydroxyquinoline and salts thereof; salicylic acid esters such as menthyl salicylate, methyl salicylate and phenyl salicylate; phenol; pyrocatechol; salicylanilide; thymol; halogenated diphenylether compounds such as triclosan and triclosan monophosphate), copper (II) compounds (e.g., copper (II) chloride, fluoride, sulfate and hydroxide), zinc ion sources (e.g., zinc acetate, citrate, gluconate, glycinate, oxide, and sulfate), phthalic acid and salts thereof (e.g., magnesium monopotassium phthalate), hexetidine, octenidine, sanguinarine, benzalkonium chloride, domiphen bromide, alkylpyridinium chlorides (e.g. cetylpyridinium chloride, tetradecylpyridinium chloride, N-tetradecyl-4-ethylpyridinium chloride), iodine, sulfonamides, bisbiguanides (e.g., alexidine, chlorhexidine, chlorhexidine digluconate), piperidino derivatives (e.g., delmopinol, octapinol), magnolia extract, grapeseed extract, rosemary extract, menthol, geraniol, citral, eucalyptol, antibiotics (e.g., augmentin, amoxicillin, tetracycline, doxycycline, minocycline, metronidazole, neomycin, kanamycin, clindamycin), and/or any antibacterial agents disclosed in U.S. Pat. No. 5,776,435, which is incorporated herein by reference. One or more antimicrobial agents can optionally be present at about 0.01-10 wt % (e.g., 0.1-3 wt %), for example, in the disclosed oral care composition.

An anticalculus or tartar control agent suitable for use in an oral care composition herein includes, for example, phosphates and polyphosphates (e.g., pyrophosphates), polyaminopropanesulfonic acid (AMPS), zinc citrate trihydrate, polypeptides (e.g., polyaspartic and polyglutamic acids), polyolefin sulfonates, polyolefin phosphates, diphosphonates (e.g.,azacycloalkane-2,2-diphosphonates such as azacycloheptane-2,2-diphosphonic acid), N-methyl azacyclopentane-2,3-diphosphonic acid, ethane-1-hydroxy-1,1-diphosphonic acid (EHDP), ethane-1-amino-1,1-diphosphonate, and/or phosphonoalkane carboxylic acids and salts thereof (e.g., their alkali metal and ammonium salts). Useful inorganic phosphate and polyphosphate salts include, for example, monobasic, dibasic and tribasic sodium phosphates, sodium tripolyphosphate, tetrapolyphosphate, mono-, di-, tri- and tetra-sodium pyrophosphates, disodium dihydrogen pyrophosphate, sodium trimetaphosphate, sodium hexametaphosphate, or any of these in which sodium is replaced by potassium or ammonium. Other useful anticalculus agents in certain embodiments include anionic polycarboxylate polymers (e.g., polymers or copolymers of acrylic acid, methacrylic, and maleic anhydride such as polyvinyl methyl ether/maleic anhydride copolymers). Still other useful anticalculus agents include sequestering agents such as hydroxycarboxylic acids (e.g., citric, fumaric, malic, glutaric and oxalic acids and salts thereof) and aminopolycarboxylic acids (e.g., EDTA). One or more anticalculus or tartar control agents can optionally be present at about 0.01-50 wt % (e.g., about 0.05-25 wt % or about 0.1-15 wt %), for example, in the disclosed oral care composition.

A surfactant suitable for use in an oral care composition herein may be anionic, non-ionic, or amphoteric, for example. Suitable anionic surfactants include, without limitation, water-soluble salts of $C_8$-$C_{20}$ alkyl sulfates, sulfonated monoglycerides of $C_8$-$C_{20}$ fatty acids, sarcosinates, and taurates. Examples of anionic surfactants include sodium lauryl sulfate, sodium coconut monoglyceride sulfonate, sodium lauryl sarcosinate, sodium lauryl isoethionate, sodium laureth carboxylate and sodium dodecyl benzenesulfonate. Suitable non-ionic surfactants include, without limitation, poloxamers, polyoxyethylene sorbitan esters, fatty alcohol ethoxylates, alkylphenol ethoxylates, tertiary amine oxides, tertiary phosphine oxides, and dialkyl sulfoxides. Suitable amphoteric surfactants include, without limitation, derivatives of $C_8$-$C_{20}$ aliphatic secondary and tertiary amines having an anionic group such as a carboxylate, sulfate, sulfonate, phosphate or phosphonate. An example of a suitable amphoteric surfactant is cocoamidopropyl betaine. One or more surfactants are optionally present in a total amount of about 0.01-10 wt % (e.g., about 0.05-5.0 wt % or about 0.1-2.0 wt %), for example, in the disclosed oral care composition.

An abrasive suitable for use in an oral care composition herein may include, for example, silica (e.g., silica gel, hydrated silica, precipitated silica), alumina, insoluble phosphates, calcium carbonate, and resinous abrasives (e.g., a urea-formaldehyde condensation product). Examples of insoluble phosphates useful as abrasives herein are orthophosphates, polymetaphosphates and pyrophosphates, and include dicalcium orthophosphate dihydrate, calcium pyrophosphate, beta-calcium pyrophosphate, tricalcium phosphate, calcium polymetaphosphate and insoluble sodium polymetaphosphate. One or more abrasives are optionally present in a total amount of about 5-70 wt % (e.g., about 10-56 wt % or about 15-30 wt %), for example, in the disclosed oral care composition. The average particle size of an abrasive in certain embodiments is about 0.1-30 microns (e.g., about 1-20 microns or about 5-15 microns).

An oral care composition in certain embodiments may comprise at least one pH-modifying agent. Such agents may be selected to acidify, make more basic, or buffer the pH of a composition to a pH range of about 2-10 (e.g., pH ranging from about 2-8, 3-9, 4-8, 5-7, 6-10, or 7-9). Examples of pH-modifying agents useful herein include, without limitation, carboxylic, phosphoric and sulfonic acids; acid salts (e.g., monosodium citrate, disodium citrate, monosodium malate); alkali metal hydroxides (e.g. sodium hydroxide, carbonates such as sodium carbonate, bicarbonates, sesquicarbonates); borates; silicates; phosphates (e.g., monosodium phosphate, trisodium phosphate, pyrophosphate salts); and imidazole.

A foam modulator suitable for use in an oral care composition herein may be a polyethylene glycol (PEG), for example. High molecular weight PEGs are suitable, including those having an average molecular weight of about 200000-7000000 (e.g., about 500000-5000000 or about 1000000-2500000), for example. One or more PEGs are optionally present in a total amount of about 0.1-10 wt % (e.g. about 0.2-5.0 wt % or about 0.25-2.0 wt %), for example, in the disclosed oral care composition.

An oral care composition in certain embodiments may comprise at least one humectant. A humectant in certain embodiments may be a polyhydric alcohol such as glycerin, sorbitol, xylitol, or a low molecular weight PEG. Most suitable humectants also may function as a sweetener herein. One or more humectants are optionally present in a total amount of about 1.0-70 wt % (e.g., about 1.0-50 wt %, about 2-25 wt %, or about 5-15 wt %), for example, in the disclosed oral care composition.

A natural or artificial sweetener may optionally be comprised in an oral care composition herein. Examples of suitable sweeteners include dextrose, sucrose, maltose, dextrin, invert sugar, mannose, xylose, ribose, fructose, levulose, galactose, corn syrup (e.g., high fructose corn syrup or corn syrup solids), partially hydrolyzed starch, hydrogenated starch hydrolysate, sorbitol, mannitol, xylitol, maltitol, isomalt, aspartame, neotame, saccharin and salts thereof, dipeptide-based intense sweeteners, and cyclamates. One or more sweeteners are optionally present in a total amount of about 0.005-5.0 wt %, for example, in the disclosed oral care composition.

A natural or artificial flavorant may optionally be comprised in an oral care composition herein. Examples of suitable flavorants include vanillin; sage; marjoram; parsley oil; spearmint oil; cinnamon oil; oil of wintergreen (methylsalicylate); peppermint oil; clove oil; bay oil; anise oil; eucalyptus oil; citrus oils; fruit oils; essences such as those derived from lemon, orange, lime, grapefruit, apricot, banana, grape, apple, strawberry, cherry, or pineapple; bean- and nut-derived flavors such as coffee, cocoa, cola, peanut, or almond; and adsorbed and encapsulated flavorants. Also encompassed within flavorants herein are ingredients that provide fragrance and/or other sensory effect in the mouth, including cooling or warming effects. Such ingredients include, without limitation, menthol, menthyl acetate, menthyl lactate, camphor, eucalyptus oil, eucalyptol, anethole, eugenol, cassia, oxanone, Irisone®, propenyl guaiethol, thymol, linalool, benzaldehyde, cinnamaldehyde, N-ethyl-p-menthan-3-carboxamine, N,2,3-trimethyl-2-isopropylbutanamide, 3-(1-menthoxy)-propane-1,2-diol, cinnamaldehyde glycerol acetal (CGA), and menthone glycerol acetal (MGA). One or more flavorants are optionally present in a total amount of about 0.01-5.0 wt % (e.g., about 0.1-2.5 wt %), for example, in the disclosed oral care composition.

An oral care composition in certain embodiments may comprise at least one bicarbonate salt. Any orally acceptable bicarbonate can be used, including alkali metal bicarbonates such as sodium or potassium bicarbonate, and ammonium bicarbonate, for example. One or more bicarbonate salts are optionally present in a total amount of about 0.1-50 wt % (e.g., about 1-20 wt %), for example, in the disclosed oral care composition.

An oral care composition in certain embodiments may comprise at least one whitening agent and/or colorant. A suitable whitening agent is a peroxide compound such as any of those disclosed in U.S. Pat. No. 8,540,971, which is incorporated herein by reference. Suitable colorants herein include pigments, dyes, lakes and agents imparting a particular luster or reflectivity such as pearling agents, for example. Specific examples of colorants useful herein include talc; mica; magnesium carbonate; calcium carbonate; magnesium silicate; magnesium aluminum silicate; silica; titanium dioxide; zinc oxide; red, yellow, brown and black iron oxides; ferric ammonium ferrocyanide; manganese violet; ultramarine; titaniated mica; and bismuth oxychloride. One or more colorants are optionally present in a total amount of about 0.001-20 wt % (e.g., about 0.01-10 wt % or about 0.1-5.0 wt %), for example, in the disclosed oral care composition.

Additional components that can optionally be included in an oral composition herein include one or more enzymes (above), vitamins, and anti-adhesion agents, for example. Examples of vitamins useful herein include vitamin C, vitamin E, vitamin B5, and folic acid. Examples of suitable anti-adhesion agents include solbrol, ficin, and quorum-sensing inhibitors.

The composition can be in any useful form, for example, as powders, granules, pastes, bars, unit dose, or liquid.

The unit dose form may be water-soluble, for example, a water-soluble unit dose article comprising a water-soluble film and a liquid or solid laundry detergent composition, also referred to as a pouch. A water-soluble unit dose pouch comprises a water-soluble film which fully encloses the liquid or solid detergent composition in at least one compartment. The water-soluble unit dose article may comprise a single compartment or multiple compartments. The water-soluble unit dose article may comprise at least two compartments or at least three compartments. The compartments may be arranged in a superposed orientation or in a side-by-side orientation.

A unit dose article is typically a closed structure, made of the water-soluble film enclosing an internal volume which comprises the liquid or solid laundry detergent composition. The pouch can be of any form and shape which is suitable to hold and protect the composition, e.g. without allowing the release of the composition from the pouch prior to contact of the pouch to water.

A liquid detergent composition may be aqueous, typically containing up to about 70% by weight of water and 0% to about 30% by weight of organic solvent. It may also be in the form of a compact gel type containing less than or equal to 30% by weight water.

A poly alpha-1,3-glucan ester as disclosed herein can be used as an ingredient in the desired product or may be blended with one or more additional suitable ingredients and used as, for example, an industrial product, a household product, fabric care applications, laundry care applications, and/or personal care applications. Any of the disclosed compositions, for example, an industrial product, a household product, a fabric care, a laundry care or a personal care composition can comprise in the range of 0.01 to 99 percent by weight of the poly alpha-1,3-glucan ester, based on the total dry weight of the composition (dry solids basis). The term "total dry weight" means the weight of the composition excluding any solvent, for example, any water that might be present. In other embodiments, the composition comprises 0.1 to 10% or 0.1 to 9% or 0.5 to 8% or 1 to 7% or 1 to 6% or 1 to 5% or 1 to 4% or 1 to 3% or 5 to 10% or 10 to 15% or 15 to 20% or 20 to 25% or 25 to 30% or 30 to 35% or 35 to 40% or 40 to 45% or 45 to 50% or 50 to 55% or 55 to 60% or 60 to 65% or 65 to 70% or 70 to 75% or 75 to 80% or 80 to 85% or 85 to 90% or 90 to 95% or 95 to 99% by weight of the poly alpha-1,3-glucan ester, wherein the percentages by weight are based on the total dry weight of the composition.

The composition can further comprise at least one of a surfactant, an enzyme, a detergent builder, a complexing agent, a polymer, a soil release polymer, a surfactancy-boosting polymer, a bleaching agent, a bleach activator, a bleaching catalyst, a fabric conditioner, a clay, a foam booster, a suds suppressor, an anti-corrosion agent, a soil-suspending agent, an anti-soil re-deposition agent, a dye, a bactericide, a tarnish inhibitor, an optical brightener, a perfume, a saturated or unsaturated fatty acid, a dye transfer inhibiting agent, a chelating agent, a hueing dye, a calcium cation, a magnesium cation, a visual signaling ingredient, an anti-foam, a structurant, a thickener, an anti-caking agent, a starch, sand, a gelling agents, or a combination thereof. In one embodiment, the enzyme is a cellulase. In another embodiment, the enzyme is a protease. In yet another embodiment, the enzyme is an amylase. In a further embodiment, the enzyme is a lipase.

The composition can be a detergent composition useful for, for example, fabric care, laundry care and/or personal care and may further contain one or more active enzymes. Non-limiting examples of suitable enzymes include proteases, cellulases, hemicellulases, peroxidases, lipolytic enzymes (e.g., metallolipolytic enzymes), xylanases, phospholipases, perhydrolases, cutinases, pectinases, pectate lyases, mannanases, keratinases, reductases, oxidases (e.g., choline oxidase), phenoloxidases, lipoxygenases, ligninases, pullulanases, tannases, pentosanases, malanases, beta-glucanases, arabinosidases, hyaluronidases, chondroitinases, laccases, metalloproteinases, amadoriases, glucoamylases, arabinofuranosidases, phytases, isomerases, transferases, nucleases, amylases, or a combination thereof. In some embodiments, a combination of two or more enzymes can be used in the composition. In some embodiments, the two or more enzymes are cellulase and one or more of proteases, hemicellulases, peroxidases, lipolytic enzymes, xylanases, lipases, phospholipases, esterases, perhydrolases, cutinases, pectinases, pectate lyases, mannanases, keratinases, reductases, oxidases, phenoloxidases, lipoxygenases, ligninases, pullulanases, tannases, pentosanases, malanases, beta-glucanases, arabinosidases, hyaluronidases, chondroitinases, laccases, metalloproteinases, amadoriases, glucoamylases, arabinofuranosidases, phytases, isomerases, transferases, nucleases, amylases, or a combination thereof. One or more of the foregoing enzymes can be comprised in any other composition disclosed herein.

A cellulase can have endocellulase activity (EC 3.2.1.4), exocellulase activity (EC 3.2.1.91), or cellobiase activity (EC 3.2.1.21). A cellulase is an "active cellulase" having activity under suitable conditions for maintaining cellulase activity; it is within the skill of the art to determine such suitable conditions. Besides being able to degrade cellulose, a cellulase in certain embodiments can also degrade cellulose ether derivatives such as carboxymethyl cellulose.

The cellulase may be derived from any microbial source, such as a bacteria or fungus. Chemically-modified cellulases or protein-engineered mutant cellulases are included. Suitable cellulases include, for example, cellulases from the genera *Bacillus, Pseudomonas, Streptomyces, Trichoderma, Humicola, Fusarium, Thielavia* and *Acremonium*. As other examples, the cellulase may be derived from *Humicola insolens, Myceliophthora thermophile, Fusarium oxysporum, Trichoderma reesei* or a combination thereof. The cellulase, such as any of the foregoing, can be in a mature form lacking an N-terminal signal peptide. Commercially available cellulases useful herein include CELLUSOFT®, CELLUCLEAN®, CELLUZYMER and CAREZYMER (Novozymes A/S); CLAZINASER and PURADAXR HA and REVITALENZ™M (DuPont Industrial Biosciences), BIOTOUCH® (AB Enzymes); and KAC-500(B)R (Kao Corporation).

Alternatively, a cellulase herein may be produced by any means known in the art, for example, a cellulase may be produced recombinantly in a heterologous expression system, such as a microbial or fungal heterologous expression system. Examples of heterologous expression systems include bacterial (e.g., *E. coli, Bacillus* sp.) and eukaryotic systems. Eukaryotic systems can employ yeast (e.g., *Pichia* sp., *Saccharomyces* sp.) or fungal (e.g., *Trichoderma* sp. such as *T. reesei, Aspergillus* species such as *A. niger*) expression systems, for example.

The cellulase in certain embodiments can be thermostable. Cellulase thermostability refers to the ability of the enzyme to retain activity after exposure to an elevated temperature (e.g. about 60-70° C.) for a period of time (e.g., about 30-60 minutes). The thermostability of a cellulase can be measured by its half-life (t1/2) given in minutes, hours, or days, during which time period half the cellulase activity is lost under defined conditions.

The cellulase in certain embodiments can be stable to a wide range of pH values (e.g. neutral or alkaline pH such as pH of ~7.0 to ~11.0). Such enzymes can remain stable for a predetermined period of time (e.g., at least about 15 min., 30 min., or 1 hour) under such pH conditions.

At least one, two, or more cellulases may be included in the composition. The total amount of cellulase in a composition herein typically is an amount that is suitable for the purpose of using cellulase in the composition (an "effective amount"). For example, an effective amount of cellulase in a composition intended for improving the feel and/or appearance of a cellulose-containing fabric is an amount that produces measurable improvements in the feel of the fabric (e.g., improving fabric smoothness and/or appearance, removing pills and fibrils which tend to reduce fabric appearance sharpness). As another example, an effective amount of cellulase in a fabric stonewashing composition herein is that amount which will provide the desired effect (e.g., to produce a worn and faded look in seams and on fabric panels). The amount of cellulase in a composition herein can also depend on the process parameters in which the composition is employed (e.g., equipment, temperature, time, and the like) and cellulase activity, for example. The effective concentration of cellulase in an aqueous composition in which a fabric is treated can be readily determined by a skilled artisan.

Suitable enzymes are known in the art and can include, for example, MAXATASE®, MAXACAL™, MAXAPEM™, OPTICLEAN®, OPTIMASE®, PROPERASE®, PURAFECT®, PURAFECT® OXP, PURAMAX™, EXCELLASE™, PREFERENZ™ proteases (e.g. P100, P110, P280), EFFECTENZ™ proteases (e.g. P1000, P1050, P2000), EXCELLENZ™ proteases (e.g. P1000), ULTIMASE®, and PURAFAST™ (Genencor); ALCALASE®, SAVINASE®, PRIMASE®, DURAZYM™, POLARZYME®, OVOZYME®, KANNASE®, LIQUANASE®, NEUTRASE®, RELASE® and ESPERASE® (Novozymes); BLAP™ and BLAP™ variants (Henkel Kommanditgesellschaft auf Aktien, Duesseldorf, Germany), and KAP (B. alkalophilus subtilisin; Kao Corp., Tokyo, Japan) proteases; MANNASTAR®, PURABRITE™, and MANNAWAY® mannanases; MI LIPASE™, LUMAFAST™, and LIPOMAX™ (Genencor); LIPEX®, LIPOLASE® and LIPOLASE® ULTRA (Novozymes); and LIPASE P™ "Amano" (Amano Pharmaceutical Co. Ltd., Japan) lipases; STAINZYME®, STAINZYME PLUS®, NATALASE®, DURAMYL®, TERMAMYL®, TERMAMYL ULTRA®, FUNGAMYL® and BAN™ (Novo Nordisk A/S and Novozymes A/S); RAPIDASE®, POWERASE®, PURASTAR® and PREFERENZ™ (DuPont Industrial Biosciences) amylases; GUARDZYME™ (Novo Nordisk A/S and Novozymes A/S) peroxidases or a combination thereof.

In some embodiments, the enzymes in the composition can be stabilized using conventional stabilizing agents, e.g., a polyol such as propylene glycol or glycerol; a sugar or sugar alcohol; lactic acid; boric acid or a boric acid derivative (e.g., an aromatic borate ester).

A detergent composition herein typically comprises one or more surfactants, wherein the surfactant is selected from nonionic surfactants, anionic surfactants, cationic surfactants, ampholytic surfactants, zwitterionic surfactants, semi-polar nonionic surfactants and mixtures thereof. The surfactant may be petroleum-derived (also referred to as synthetic) or non-petroleum-derived (also referred to as natural). A detergent will usually contain an anionic surfactant such as linear alkylbenzenesulfonate (LAS), alpha-olefinsulfonate (AOS), alkyl sulfate (fatty alcohol sulfate) (AS), alcohol ethoxysulfate (AEOS or AES), secondary alkanesulfonates (SAS), alpha-sulfo fatty acid methyl esters, alkyl- or alkenylsuccinic acid, or soap.

The detergent composition may comprise an alcohol ethoxysulfate of the formula $R^1$—$(OCH_2CH_2)_x$—O—$SO_3M$, wherein $R^1$ is a non-petroleum derived, linear or branched fatty alcohol consisting of even numbered carbon chain lengths of from about $C_8$ to about $C_{20}$, and wherein x is from about 0.5 to about 8, and where M is an alkali metal or ammonium cation. The fatty alcohol portion of the alcohol ethoxysulfate ($R^1$) is derived from a renewable source (e.g., animal or plant derived) rather than geologically derived (e.g., petroleum-derived). Fatty alcohols derived from a renewable source may be referred to as natural fatty alcohols. Natural fatty alcohols have an even number of carbon atoms with a single alcohol (—OH) attached to the terminal carbon. The fatty alcohol portion of the surfactant ($R^1$) may comprise distributions of even number carbon chains, e.g., $C_{12}$, $C_{14}$, $C_{16}$, $C_{18}$, and so forth.

In addition, a detergent composition may optionally contain a nonionic surfactant such as alcohol ethoxylate (AEO or AE), carboxylated alcohol ethoxylates, nonylphenol ethoxylate, alkylpolyglycoside, alkyldimethylamineoxide, ethoxylated fatty acid monoethanolamide, fatty acid monoethanolamide, or polyhydroxy alkyl fatty acid amide. The detergent composition may comprise an alcohol ethoxylate of formula $R^2$—$(OCH_2CH_2)_y$—OH, wherein $R^2$ is a non-petroleum derived, linear or branched fatty alcohol consisting of even numbered carbon chain lengths of from about $C_{10}$ to about $C_{18}$, and wherein y is from about 0.5 to about 15. The fatty alcohol portion of the alcohol ethoxylate ($R^2$) is derived from a renewable source (e.g., animal or plant derived) rather than geologically derived (e.g., petroleum-derived). The fatty alcohol portion of the surfactant ($R^2$) may comprise distributions of even number carbon chains, e.g., $C_{12}$, $C_{14}$, $C_{16}$, $C_{18}$, and so forth.

The composition can further comprise one or more detergent builders or builder systems. Builders include, for example, the alkali metal, ammonium and/or alkanolammonium salts of polyphosphates, alkali metal silicates, alkaline earth and alkali metal carbonates, aluminosilicates, polycarboxylate compounds, ether hydroxypolycarboxylates, copolymers of maleic anhydride with ethylene or vinyl methyl ether, 1,3,5-trihydroxy benzene-2,4,6-trisulphonic acid, and carboxymethyloxysuccinic acid, the various alkali metal, ammonium and substituted ammonium salts of polyacetic acids such as ethylenediamine tetraacetic acid and nitrilotriacetic acid, as well as polycarboxylates such as mellitic acid, succinic acid, citric acid, oxydisuccinic acid, polymaleic acid, benzene 1,3,5-tricarboxylic acid, carboxymethyloxysuccinic acid, and soluble salts thereof. Examples of a detergent builder or complexing agent include zeolite, diphosphate, triphosphate, phosphonate, citrate, nitrilotriacetic acid (NTA), ethylenediaminetetraacetic acid (EDTA), diethylenetriaminepentaacetic acid (DTMPA), alkyl- or alkenylsuccinic acid, soluble silicates or layered silicates (e.g., SKS-6 from Hoechst). A detergent may also be unbuilt, i.e., essentially free of detergent builder.

The composition can further comprise at least one chelating agent. Suitable chelating agents include, for example, copper, iron and/or manganese chelating agents and mixtures thereof.

The composition can further comprise at least one deposition aid. Suitable deposition aids include, for example, polyethylene glycol, polypropylene glycol, polycarboxylate, soil release polymers such as polytelephthalic acid, clays such as kaolinite, montmorillonite, atapulgite, illite, bentonite, halloysite, or a combination thereof.

The composition can further comprise one or more dye transfer inhibiting agents. Suitable dye transfer inhibiting agents include, for example, polyvinylpyrrolidone polymers, polyamine N-oxide polymers, copolymers of N-vinylpyrrolidone and N-vinylimidazole, polyvinyloxazolidones, polyvinylimidazoles, manganese phthalocyanine, peroxidases, polyvinylpyrrolidone polymers, ethylene-diamine-tetraacetic acid (EDTA); diethylene triamine penta methylene phosphonic acid (DTPMP); hydroxy-ethane diphosphonic acid (HEDP); ethylenediamine N,N'-disuccinic acid (EDDS); methyl glycine diacetic acid (MGDA); diethylene triamine penta acetic acid (DTPA); propylene diamine tetraacetic acid (PDT A); 2-hydroxypyridine-N-oxide (HPNO); or methyl glycine diacetic acid (MGDA); glutamic acid N,N-diacetic acid (N,N-dicarboxymethyl glutamic acid tetrasodium salt (GLDA); nitrilotriacetic acid (NTA); 4,5-dihydroxy-m-benzenedisulfonic acid; citric acid and any salts thereof; N-hydroxyethylethylenediaminetriacetic acid (HEDTA), triethylenetetraaminehexaacetic acid (TTHA), N-hydroxyethyliminodiacetic acid (HEIDA), dihydroxyethylglycine (DHEG), ethylenediaminetetrapropionic acid (EDTP) and derivatives thereof or a combination thereof.

The composition can further comprise silicates. Suitable silicates can include, for example, sodium silicates, sodium disilicate, sodium metasilicate, crystalline phyllosilicates or a combination thereof.

The composition can further comprise dispersants. Suitable water-soluble organic materials can include, for example, homo- or co-polymeric acids or their salts, in which the polycarboxylic acid comprises at least two carboxyl radicals separated from each other by not more than two carbon atoms.

The composition can further comprise one or more other types of polymers in addition to the present poly alpha-1,3-glucan ester. Examples of other types of polymers useful herein include carboxymethyl cellulose (CMC), poly(vinylpyrrolidone) (PVP), polyethylene glycol (PEG), poly (vinyl alcohol) (PVA), polycarboxylates such as polyacrylates, maleic/acrylic acid copolymers and lauryl methacrylate/acrylic acid copolymers.

The composition can further comprise a bleaching system. For example, the bleaching system can comprise an H2O2 source such as perborate, percarbonate, perhydrate salts, mono or tetra hydrate sodium salt of perborate, persulfate, perphosphate, persilicate, percarboxylic acids and salts, percarbonic acids and salts, perimidic acids and salts, peroxymonosulfuric acids and salts, sulfonated zinc phthalocyanines, sulfonated aluminum phthalocyanines, xanthene dyes which may be combined with a peracid-forming bleach activator such as, for example, dodecanoyl oxybenzene sulfonate, decanoyl oxybenzene sulfonate, decanoyl oxybenzoic acid or salts thereof, tetraacetylethylenediamine (TAED) or nonanoyloxybenzenesulfonate (NOBS). Alternatively, a bleaching system may comprise peroxyacids (e.g., amide, imide, or sulfone type peroxyacids). In other embodiments, the bleaching system can be an enzymatic bleaching system comprising perhydrolase. Combinations of any of the above may also be used.

The composition can further comprise conventional detergent ingredients such as fabric conditioners, clays, foam boosters, suds suppressors, anti-corrosion agents, soil-suspending agents, anti-soil redeposition agents, dyes, bactericides, tarnish inhibiters, optical brighteners, or perfumes. The pH of a detergent composition herein (measured in aqueous solution at use concentration) can be neutral or alkaline (e.g., pH of about 7.0 to about 11.0).

The composition can be a detergent composition and optionally, a heavy duty (all purpose) laundry detergent composition. In some embodiments, the detergent composition can comprise a detersive surfactant (10%-40% wt/wt), including an anionic detersive surfactant (selected from a group of linear or branched or random chain, substituted or unsubstituted alkyl sulphates, alkyl sulphonates, alkyl alkoxylated sulphate, alkyl phosphates, alkyl phosphonates, alkyl carboxylates, and/or mixtures thereof), and optionally non-ionic surfactant (selected from a group of linear or branched or random chain, substituted or unsubstituted alkyl alkoxylated alcohol, e.g., $C_8$-$C_{18}$ alkyl ethoxylated alcohols and/or $C_6$-$C_{12}$ alkyl phenol alkoxylates), where the weight ratio of anionic detersive surfactant (with a hydrophilic index (HIc) of from 6.0 to 9) to non-ionic detersive surfactant is greater than 1:1. Suitable detersive surfactants also include cationic detersive surfactants (selected from a group of alkyl pyridinium compounds, alkyl quaternary ammonium compounds, alkyl quaternary phosphonium compounds, alkyl ternary sulphonium compounds, and/or mixtures thereof); zwitterionic and/or amphoteric detersive surfactants (selected from a group of alkanolamine sulphobetaines); ampholytic surfactants; semi-polar non-ionic surfactants and mixtures thereof.

The composition can be a detergent composition, optionally including, for example, a surfactancy boosting polymer consisting of amphiphilic alkoxylated grease cleaning polymers. Suitable amphiphilic alkoxylated grease cleaning polymers can include, for example, alkoxylated polymers having branched hydrophilic and hydrophobic properties, such as alkoxylated polyalkylenimines, random graft polymers comprising a hydrophilic backbone comprising monomers, for example, unsaturated $C_1$-$C_6$ carboxylic acids, ethers, alcohols, aldehydes, ketones, esters, sugar units, alkoxy units, maleic anhydride, saturated polyalcohols such as glycerol, and mixtures thereof; and hydrophobic side chain(s), for example, one or more $C_4$-$C_{25}$ alkyl groups, polypropylene, polybutylene, vinyl esters of saturated $C_1$-$C_6$ mono-carboxylic acids, $C_1$-$C_6$ alkyl esters of acrylic or methacrylic acid, and mixtures thereof.

Suitable heavy duty laundry detergent compositions can optionally include additional polymers such as soil release polymers (include anionically end-capped polyesters, for example SRP1, polymers comprising at least one monomer unit selected from saccharide, dicarboxylic acid, polyol and combinations thereof, in random or block configuration, ethylene terephthalate-based polymers and co-polymers thereof in random or block configuration, for example REPEL-O-TEX SF, SF-2 AND SRP6, TEXCARE SRA100, SRA300, SRN100, SRN170, SRN240, SRN300 AND SRN325, MARLOQUEST SL), anti-redeposition polymers, include carboxylate polymers, such as polymers comprising at least one monomer selected from acrylic acid, maleic acid (or maleic anhydride), fumaric acid, itaconic acid, aconitic acid, mesaconic acid, citraconic acid, methylenemalonic acid, and any mixture thereof, vinylpyrrolidone homopolymer, and/or polyethylene glycol, molecular weight in the range of from 500 to 100,000 Daltons (Da); and polymeric carboxylate (such as maleate/acrylate random copolymer or polyacrylate homopolymer). If present, soil release polymers can be included at 0.1 to 10% by weight, based on the total weight of the composition.

The heavy duty laundry detergent composition can optionally further include saturated or unsaturated fatty acids, preferably saturated or unsaturated $C_{12}$-$C_{24}$ fatty acids; deposition aids, for example, polysaccharides, cellulosic polymers, poly diallyl dimethyl ammonium halides (DADMAC), and co-polymers of DADMAC with vinyl pyrrolidone, acrylamides, imidazoles, imidazolinium halides, and mixtures thereof, in random or block configuration, cationic guar gum, cationic starch, cationic polyacylamides or a combination thereof. If present, the fatty acids and/or the deposition aids can each be present at 0.1% to 10% by weight, based on the total weight of the composition.

The detergent composition may optionally include silicone or fatty-acid based suds suppressors; hueing dyes, calcium and magnesium cations, visual signaling ingredients, anti-foam (0.001% to about 4.0% by weight, based on the total weight of the composition), and/or a structurant/thickener (0.01% to 5% by weight, based on the total weight of the composition) selected from the group consisting of diglycerides and triglycerides, ethylene glycol distearate, microcrystalline cellulose, microfiber cellulose, biopolymers, xanthan gum, gellan gum, and mixtures thereof).

The compositions disclosed herein can be in the form of a dishwashing detergent composition. Examples of dishwashing detergents include automatic dishwashing detergents (typically used in dishwasher machines) and hand-washing dish detergents. A dishwashing detergent composition can be in any dry or liquid/aqueous form as disclosed herein, for example. Components that may be included in certain embodiments of a dishwashing detergent composition include, for example, one or more of a phosphate; oxygen- or chlorine-based bleaching agent; non-ionic surfactant; alkaline salt (e.g., metasilicates, alkali metal hydroxides, sodium carbonate); any active enzyme disclosed herein; anti-corrosion agent (e.g., sodium silicate); anti-foaming agent; additives to slow down the removal of glaze and patterns from ceramics; perfume; anti-caking agent (in granular detergent); starch (in tablet-based detergents); gelling agent (in liquid/gel based detergents); and/or sand (powdered detergents).

Additional examples of personal care, household care, and other products and ingredients herein can be any as disclosed in U.S. Pat. No. 8,796,196, which is incorporated herein by reference. Examples of personal care, household care, and other products and ingredients herein include perfumes, fragrances, air odor-reducing agents, insect repellents and insecticides, bubble-generating agents such as surfactants, pet deodorizers, pet insecticides, pet shampoos, disinfecting agents, hard surface (e.g., floor, tub/shower, sink, toilet bowl, door handle/panel, glass/window) treatment agents (e.g., cleaning, disinfecting, and or coating agents), wipes and other non-woven materials, colorants, preservatives, antioxidants, emulsifiers, emollients, oils, medicaments, flavors, and suspending agents.

EXAMPLES

The exemplary compounds identified by "E" in the tables below are intended only to further illuminate and not to limit the scope of compounds, processes, and articles described and recited herein. Comparative examples are identified in the tables below by "C".

Materials

Solvents and reagents were purchased from Sigma-Aldrich Co. Llc, USA.
Dimethylacetamide (DMAc) is anhydrous grade (99.8%).
Acid chlorides and anhydrides are reagent grade.

Test Methods

Two types of test bars were prepared for analysis, an ASTM D638 type V bar, except the width was 0.25" instead of 0.125" and an ASTM D790 flex bar. Molded bars were conditioned at 23° C., 50% R.H. for >40 hours before testing. Tensile bars were tested using an Instron 1123 load frame. The reported elastic modulus is non-standard as an extensometer was not used (the nominal strain was instead calculated from cross-head displacement and initial grip separation). Flex bars were notched using a Tinius Olsen model 899 specimen notcher and impact testing was performed using a Ceast® Resil Impactor (type 6967.000).

The temperature at which the glucan esters melted and flowed was estimated using an Olympus BX53 microscope equipped with a Linkam LTS420 temperature controlled stage. Polymer powder (<1 mg) was placed on a microscope slide pre-loaded into the hot stage and a coverslip was added. The hot stage was heated at a rate of 10° C. /min. When the polymer appeared to melt, the heating was paused and mechanical pressure was applied using a tweezers to aid in the melt determination. The heating was then re-engaged and the procedure was repeated to estimate the temperature at which the polymer flowed. Unless otherwise noted, the melt/flow determinations were made on neat (un-plasticized) samples.

Mini-Tensile Bar Preparation

Glucan derivatives were extruded using a DSM Xplore™ model 2005 15 cm$^3$ twin-screw micro compounder. Polymer samples were dried after preparation by vacuum oven followed by Schlenk line, and stored in sealable plastic bags. Plasticized samples were prepared by dry mixing the plasticizer with polymer powder immediately before loading into the micro compounder. Un-plasticized samples were typically extruded at 100 RPM for 1 minute while plasticized samples were extruded for 2 minutes. Samples were injection molded using a DSM Xplore™ 10 cm$^3$ injection molding machine.

ABBREVIATIONS

A.C. means acid chloride
An. means anhydride
D.T. means decomposition temperature
TEC means triethyl citrate
DEHA means bis(2-ethylhexyl) adipate

Representative Preparation of Poly Alpha-1,3-Glucan

Poly alpha-1,3-glucan described herein can be prepared using a gtfJ enzyme preparation as described in U.S. Pat. No. 7,000,000; U.S. Patent Appl. Publ. No. 2013/0244288, now U.S. Pat. No. 9,080,195; and U.S. Patent Appl. Publ. No. 2013/0244287, now U.S. Pat. No. 8,642,757 (all of which are incorporated herein by reference in their entirety).

Poly alpha-1,3-glucan polymer can be synthesized, and wet cake thereof prepared, following the procedures disclosed in U.S. Appl. Publ. No. 2014/0179913, now U.S. Pat. No. 9,139,718 (see Example 12 therein, for example), both of which are incorporated herein by reference in their entirety.

A nonlimiting example of the preparation of poly alpha-1,3-glucan is as follows: a slurry of poly alpha-1,3-glucan was prepared from an aqueous solution (0.5 L) containing *Streptococcus salivarius* gtfJ enzyme (100 unit/L), sucrose (100 g/L) obtained from OmniPur Sucrose (EM8550), potassium phosphate buffer (10 mM) obtained from Sigma Aldrich, and FermaSure®, an antimicrobial agent, (100 ppm) obtained from DuPont adjusted to pH 5.5. The resulting enzyme reaction solution was maintained at 20-25° C. for either 24 hours or 4 hours. A slurry was formed since the poly alpha-1,3-glucan synthesized in the reaction was aqueous insoluble. The poly alpha-1,3-glucan solids produced in the reaction were collected using a Buchner funnel fitted with a 325-mesh screen over 40 micrometer filter paper, forming the wet cake which contains about 60-80 wt % of water.

Glucan dry powder was obtained from wet cake that had been isolated as described above, dried, and sieved to the appropriate mesh grade. In the experiments below, this material is referred to as "poly alpha-1,3-glucan powder". Poly alpha-1,3-glucan powder contained ~10% water.

Insoluble poly alpha-1,3-glucan can also be prepared according to the following procedure using a glucosyltransferase that produces low molecular weight poly alpha-1,3-glucan. Examples of glucosyltransferases with this activity are disclosed in U.S. Patent Appl. Publ. No. 2019/0276806, which is incorporated herein by reference. A reaction mixture (10 L) comprised of sucrose (350 g/L), glucosyltransferase (3%, v/v), and 10 mM sodium phosphate buffer was adjusted to pH 5.7 and reacted at 40° C. with 100 rpm overhead stirring. Aliquots (1.5 mL) were withdrawn at predetermined times and quenched by heating at 90° C. for 15 min. The resulting heat-treated aliquots were centrifuged at 13000 rpm for 10 min on a table microcentrifuge. Supernatant was diluted 4 times with water and passed through 0.45-μm PTFE syringeless filter device. Flow-through was analyzed by HPLC to determine the concentration of sucrose, glucose, fructose, leucrose, and oligosaccharides up to DP7. Concentration of the insoluble polysaccharide was calculated from the HPLC data and based on total glucosyls. After 24 h, the reaction mixture was heated to 75° C. and then held for 30 minutes before being cooled down to below 50° C. An aliquot (1.5 mL) of the heat-treated reaction mixture (EOR sample) was taken at 27 hr and processed/analyzed the same as other aliquots. The rest was processed by vacuum filtration. Insoluble material was retained and extensively washed with water. Cleaned insoluble material was then collected and dried in a vacuum oven before being grinded into fine powder. The insoluble material was determined to be poly alpha-1,3-glucan with a $DP_w$ of 21. Such glucan is contemplated to be useful in practicing the below Examples.

Example 1: Poly Alpha-1,3-Glucan Triacetate

Glucan acetate was prepared using several synthetic routes to produce various
degrees of substitution.

*Vacuum dried poly alpha-1,3-glucan powder (124.92 g) was added to stirring DMAc (1000 mL) in a 2 liter reaction kettle. The suspension was heated to 100° C. for ~40 minutes, cooled to 50° C., and a solution of acetyl chloride (200 mL) in DMAc (230 mL) was added. The viscous solution was stirred at 60° C. for 3.5 hours. The reaction was precipitated into water using a Waring blender. The solid was filtered and washed with aqueous $NaHCO_3$ (2.5 wt. %) until pH 7, water, water/methanol (60/40 v/v), and soaked in methanol overnight. The mixture was filtered and the solid was washed with methanol before drying in a vacuum oven followed by a Schlenk line. The product was isolated as a fine white powder (186 g, 86% yield). The degree of substitution was determined by $^1$H NMR in TFA-d/benzene-d6 ($DS_A$=2.5). SEC (in HFIP) indicated a $M_w$ of 176 kDa.

** Poly alpha-1,3-glucan powder (56.20 g, 89% solids) was boiled in water (~200 mL) for 1 hour and filtered. The solid was suspended in acetic acid (200 mL) for ~3 minutes and filtered. The acetic acid wash was repeated a second time. To a 1 liter round bottom flask was added acetic acid (500 mL), sulfuric acid (0.56 mL), and the activated glucan (with stirring). The suspension was stirred for 2 minutes and acetic anhydride (125 mL) was added drop-wise over 3 minutes. The reaction was heated to 40° C. and stirred for 3 hours. Additional acetic (100 mL) and sulfuric (0.28 mL) acid were added and the reaction was stirred for an additional 2.5 hours. Water (100 mL) was added and the solution was heated to 108° C over 1.5 hours. The reaction was cooled to 75° C. and precipitated into ice water using a Waring blender. The precipitate was filtered, washed with water, and soaked in $NaHCO_3$ (5 wt. %) for 65 hours. The mixture was filtered and the solid was washed with water (3×), methanol (3×), and dried under vacuum at 60° C. The product was isolated as a fine white powder (61.15 g, 72% yield). The degree of substitution was determined by 1H NMR in $CDCl_3$ (DSA=2.7). SEC (in HFIP) indicated a $M_w$ of 81 kDa.

Table 1 shows some properties of various poly alpha-1,3-glucan acetates having different degrees of substitution. It was found that the fully substituted material (triacetate) would not melt or flow (even when 15 wt % TEC plasticizer was added). When the degree of substitution was below 1.7 the material would melt, but not flow, and when the degree of substitution was below 0.7, the material would not melt or flow; see table below.

TABLE 1

| Example # | Acetate DoS | Melting temp. | Flow temp. | Route |
|---|---|---|---|---|
| E1A | 0.7 | >D.T. | >D.T. | A. C. |
| E1B | 1.7 | 250° C. | >D.T. | A. C. |
| E1C | 2.1 | 225° C. | 240° C. | A. C. |
| E1D* | 2.5 | 215° C. | 240° C. | A. C. |
| E1E** | 2.7 | 225° C. | 240° C. | An. |
| E1F | 3.0 | >D.T. | >D.T. | An. |

Glucan acetate was injection molded into mini-tensile bars both with and without plasticizer. Table 2 shows various properties of these molded mini-tensile bars.

TABLE 2

| Example # | Acetate DoS | Molding temp. | Plasticizer | Tensile Strength (MPa) | Elongation at break (%) | Izod impact strength (J/m) |
|---|---|---|---|---|---|---|
| E1C | 2.1 | 240° C. | none | 105 ± 4.7 | 16.4 ± 0.3 | |
| E1C | 2.1 | 210° C. | 16% TEC | 75.6 ± 6.3 | 18.7 ± 0.9 | |
| E1D | 2.5 | 195° C. | 16% TEC | 74.6 ± 5.8 | 16.4 ± 1.7 | 102 ± 38 |
| E1D | 2.5 | 210° C. | 10% TEC | 99.6 ± 3.0 | 15.6 ± 1.3 | 178 ± 105 |
| E1E | 2.7 | 195° C. | 16% TEC | 73.2 ± 6.4 | 14.1 ± 2.8 | |

Example 2: Poly Alpha-1,3-Glucan Acetate Proprionate

Glucan acetate/propionate was prepared with varying ratios of acetate to propionate.

*Vacuum dried poly alpha-1,3-glucan powder (37.20 g) was added to stirring DMAc (400 mL) in a 1 liter reaction kettle. The suspension was heated to 100° C. for ~90 minutes, cooled to 60° C., and a solution of propionyl chloride (60 mL) in DMAc (40 mL) was added. After 10 minutes, acetic anhydride (40 mL) was added and the reaction was stirred at 60° C. for 4 hours. The reaction was precipitated into water using a Waring blender. The precipitate was filtered and the solid was washed with water, aqueous NaHCO$_3$ (2.5 wt. %) until pH 7, water, and then soaked in water/methanol (50/50 v/v) overnight. The solid was filtered and washed two additional times with water/methanol (50/50 v/v). The solid was dried in a vacuum oven followed by a Schlenk line. The product was isolated as a fine white powder (63 g, 96% yield). The degree of substitution was determined by $^1$H NMR in CDCl$_3$ (DS$_A$0.5, DS$_P$=1.8). SEC (in HFIP) indicated a M$_w$ of 124 kDa.

** Poly alpha-1,3-glucan powder (39.21 g, 89.5% solids) was boiled in water (150 mL) for 1 hour and filtered. The solid was suspended in propionic acid (75 mL) for ~3 minutes and filtered. The propionic acid wash was repeated a second time. To a 1 liter reaction kettle was added propionic acid (200 mL), acetic anhydride (130 mL), sulfuric acid (0.380 mL), the activated glucan (76.919 g), and propionic acid (100 mL). The reaction was heated to 40° C., stirred for 2 hours, and deionized water (100 mL) was added. The solution was heated to 94° C. and stirred for 1 hour. The reaction was allowed to cool before precipitation into water using a Waring blender. The precipitate was washed with water, aqueous NaHCO$_3$ (2.5 wt. %), water, and methanol. The solid was dried in a vacuum oven followed by a Schlenk line. The product was isolated as a fine white powder (mass=58.9 g; 81% yield). The degree of substitution was determined by $^1$H NMR in CDCl$_3$ (DS$_A$=1.6, DS$_P$=1.1). SEC (in HFIP) indicated a M$_w$ of 68 kDa While increased propionate content decreased the melting temperature, melt-flow was not observed for any of the fully substituted derivatives (including glucan tripropionate) as shown in Table 3.

TABLE 3

| Example # | Acetate DoS | Propionate DoS | Melting temp. | Flow temp. | Route |
|---|---|---|---|---|---|
| E2A | 2.3 | 0.7 | 225° C. | >D.T. | An. |
| E2B | 1.2 | 1.8 | 200° C. | >D.T. | An. |
| E2C | 0.5 | 2.5 | 200° C. | >D.T. | An. |
| E2D | 0.0 | 3.0 | 175° C. | >D.T. | An. |
| E2E | 0.3 | 1.5 | 185° C. | 200° C. | A. C. |
| E2F* | 0.5 | 1.8 | 185° C. | 200° C. | A. C. |
| E2G | 1.0 | 1.4 | 215° C. | 215° C. | A. C. |
| E2H** | 1.6 | 1.1 | 215° C. | 215° C. | An. |

Glucan acetate propionate was injection molded into mini-tensile bars and the properties were evaluated as shown in Table 4.

TABLE 4

| Example # | Acetate DoS | Propionate DoS | Molding temp. | Plasticizer | Tensile Strength (MPa) | Elongation at break (%) |
|---|---|---|---|---|---|---|
| E2F | 0.5 | 1.8 | 210° C. | none | 81.6 ± 9.1 | 14.1 ± 3.8 |
| E2F | 0.5 | 1.8 | 170° C. | 16% TEC | 40.1 ± 3.8 | 22.0 ± 3.0 |
| E2G | 1.0 | 1.4 | 195° C. | 10% TEC | 77.5 ± 3.3 | 16.7 ± 1.7 |
| E2H | 1.6 | 1.1 | 180° C. | 10% TEC | 60.9 ± 4.2 | 9.0 ± 0.7 |

Example 3: Poly Alpha-1,3-Glucan Acetate Butyrate

Glucan acetate butyrate was made with varying ratios of acetate to butyrate.

\* Poly alpha-1,3-glucan powder (130 g, 88% solids) was boiled in deionized water (800 mL) for 1 hour and filtered. The solid was stirred in glacial acetic acid (750 mL) for ~3 minutes and filtered. The glacial acetic acid wash was repeated a second time. To a 4 liter reaction kettle was added dichloromethane (715 mL), butyric anhydride (1105 mL), butyric acid (750 mL), glacial acetic acid (360 mL), and the activated glucan. A chilled solution of butyric anhydride (59 mL) containing 70% aqueous Perchloric acid (1.3 mL) was added to the stirring reaction mixture. The reaction was slowly heated to 50° C. over a period of 4 hours, and then cooled to ~30° C. The reaction solution was precipitated into methanol/water (70/30 v/v) using a Waring blender. The solid was washed with methanol, aqueous $NaHCO_3$ (2.5 wt. %) until pH 7, and then soaked in water overnight. The solid was filtered, washed with methanol, and dried in a vacuum oven followed by a Schlenk line. The product was isolated as a fine white powder (mass=213 g; 89% yield). The degree of substitution was determined by $^1H$ NMR in $CDCl_3$ ($DS_A$=1.4, DSB=1.6). SEC (in HFIP) indicated a $M_w$ of 94 kDa.

+Vacuum dried poly alpha-1,3-glucan powder (20.67 g) was added to stirring DMAc (200 mL) in a 500 mL round bottom flask. The suspension was heated to 100° C. for ~45 minutes, cooled to 60° C., and acetic anhydride (25 mL) was added followed by a solution of butyryl chloride (40 mL) in DMAc (50 mL). The viscous solution was diluted with DMAc (100 mL) and stirred for 5 hours at 60° C. The reaction was precipitated into water using a Waring blender. The solid was filtered and washed with aqueous $NaHCO_3$ (2.5 wt. %) until pH 7, water, water/methanol (50/50 v/v), and then soaked in water/methanol (50/50 v/v) overnight. The solid was filtered, washed with water/methanol (50/50 v/v), and dried in a vacuum oven followed by a Schlenk line. The product was isolated as a fine white powder (mass=36.81 g; 94% yield). The degree of substitution was determined by $^1H$ NMR in $CDCl_3$ ($DS_A$=0.8, $DS_B$=1.4). SEC (in HFIP) indicated a $M_w$ of 302 kDa.

Unlike glucan acetate and glucan acetate propionate, fully substituted glucan acetate butyrate (DoS=3.0) was found to melt/flow if the butyrate content was approximately greater than 1.4 as shown in Table 5

TABLE 5

| Example # | Acetate DoS | Butyrate DoS | Melting temp. | Flow temp. | Route |
|---|---|---|---|---|---|
| E3A | 2.1 | 0.9 | 200° C. | >D.T. | An. |
| E3B | 1.6 | 1.4 | 175° C. | 200° C. | An. |
| E3C* | 1.4 | 1.6 | 175° C. | 200° C. | An. |
| E3D | 1.3 | 1.7 | 175° C. | 200° C. | An. |
| E3E+ | 0.8 | 1.4 | 175° C. | 200° C. | A. C. |

Samples of glucan acetate butyrate were injection molded into mini-tensile bars and the properties were evaluated. See Table 6.

TABLE 6

| Example # | Acetate DoS | Butyrate DoS | Molding temp. | Plasticizer | Tensile Strength (MPa) | Elongation at break (%) | Izod impact strength (J/m) |
|---|---|---|---|---|---|---|---|
| E3C | 1.4 | 1.6 | 200° C. | none | 61.2 ± 4.7 | 12.6 ± 1.5 | |
| E3D | 1.3 | 1.7 | 220° C. | none | 71.4 ± 0.7 | 9.2 ± 0.5 | 141 ± 21 |
| E3E | 0.8 | 1.4 | 210° C. | none | 49.5 ± 1.6 | 14.0 ± 1.2 | |
| E3E | 0.8 | 1.4 | 190° C. | 10% DEHA | 35.2 ± 2.1 | 16.4 ± 3.1 | |

Example 4: Poly Alpha-1,3-Glucan Formate Acetate

*To a 2 liter reaction kettle was added dichloromethane (350 mL), formic acid (350 mL), and poly alpha-1,3-glucan powder (50.39 g, 88% solids) with stirring. The reaction was cooled to 5° C. and acetic anhydride (300 mL) was added dropwise over 15 minutes. A chilled solution of Perchloric acid (0.50 mL) in acetic anhydride (50 mL) was added dropwise over 15 minutes. The reaction bubbled vigorously initially, but subsided with time. The solution was stirred for 5 hours at 22° C. The reaction was precipitated into methanol using a Waring blender. The solid was washed with methanol, aqueous $NaHCO_3$ (2.5 wt. %) until pH 7, water, and methanol. The solid was dried under ambient conditions followed by a Schlenk line. The product was isolated as a white powder (61.315 g, 92% yield). The degree of substitution was determined by $^1H$ NMR in $CDCl_3$ ($DS_F$=1.0, $DS_A$=1.7). SEC (in HFIP) indicated a $M_w$ of 120 kDa. Glucan formate acetate was prepared at varying ratios of formate to acetate by changing the reaction stoichiometry and/or addition order. With high formate content, the products contained residual hydroxyl content. With high acetate content, the derivatives were fully substituted, and similar to glucan triacetate, would not melt or flow, as shown in Table 7.

TABLE 7

| Example # | Formate DoS | Acetate DoS | Melting temp. | Flow temp. |
|---|---|---|---|---|
| E4A | 1.7 | 0.8 | >D.T. | >D.T. |
| E4B* | 1.0 | 1.7 | 225° C. | 250° C. |
| E4C | 0.1 | 2.9 | >D.T. | >D.T. |

A sample of glucan formate acetate was injection molded and the tensile properties were evaluated, see Table 8.

TABLE 8

| Example # | Formate DoS | Acetate DoS | Molding temp. | Plasticizer | Tensile Strength (MPa) | Elongation at break (%) |
|---|---|---|---|---|---|---|
| E4B | 1.0 | 1.7 | 230° C. | 20% TEC | 42.4 ± 0.3 | 8.7 ± 1.0 |

Example 5: Poly Alpha-1,3-Glucan Formate Propionate

Glucan formate propionate was prepared to compare the melt properties to the other formylated esters. At similar degrees of substitution, it was found to melt at a lower temperature than the formate acetate as shown in Table 9.

TABLE 9

| Example # | Formate DoS | Propionate DoS | Melting temp. | Flow temp. |
|---|---|---|---|---|
| E5A | 1.2 | 1.8 | 200° C. | 225° C. |

Example 6: Poly Alpha-1,3-Glucan Formate Butyrate

*To a 2 liter reaction kettle was added dichloromethane (350 mL), formic acid (350 mL), poly alpha-1,3-glucan powder (57.01 g, 88% solids) with stirring, and butyric anhydride (425 mL). The reaction was cooled to 15° C. and Perchloric acid (0.50 mL) was added. The reaction bubbled vigorously initially, but subsided with time. The solution was stirred for 5 hours at 30° C. and the reaction was precipitated into methanol using a Waring blender. The solid was isolated by filtration and washed with methanol, aqueous $NaHCO_3$ (2.5 wt. %) until pH 7, and then soaked in water overnight. The suspension was filtered and the solid was washed with water followed by methanol. The solid was dried in a vacuum oven followed by a Schlenk line. A portion of the product required additional purification, which was accomplished by re-precipitation (chloroform into methanol) and the previous washing steps were repeated (2× methanol, aqueous $NaHCO_3$ (2.5 wt. %), water, methanol). The product was isolated as a fine white powder (78.30 g, 91% yield). The degree of substitution was determined by $^1H$ NMR in $CDCl_3$ ($DS_F$=1.4, $DS_B$=1.2). SEC (in HFIP) indicated a $M_w$ of 65 kDa.

Glucan formate butyrate was prepared at several formate to butyrate ratios with melt and flow temperatures shown in Table 10.

TABLE 10

| Example # | Formate DoS | Butyrate DoS | Melting temp. | Flow temp. |
|---|---|---|---|---|
| E6A* | 1.4 | 1.2 | 175° C. | 200° C. |
| E6B | 1.1 | 1.8 | 175° C. | 175° C. |

A sample of glucan formate butyrate was injection molded into mini-tensile bars and the properties were evaluated as shown in Table 11.

TABLE 11

| Example # | Formate DoS | Acetate DoS | Molding temp. | Plasticizer | Tensile Strength (MPa) | Elongation at break (%) |
|---|---|---|---|---|---|---|
| E6A | 1.4 | 1.2 | 200° C. | none | 61.7 ± 6.3 | 14.4 ± 2.3 |

Example 7: Poly Alpha-1,3-Glucan Hexanoate Acetate

*Vacuum dried poly alpha-1,3-glucan powder (31.65 g) was added to stirring DMAc (300 mL) in a 1 liter reaction kettle. The suspension was heated to 100° C. for 30 minutes, cooled to 50° C., and solutions of hexanoyl chloride (27.5 mL) in DMAc (50 mL) and acetyl chloride (40 mL) in DMAc (50 mL) were added. The reaction was stirred for 4 hours at 60° C. and precipitated into water/methanol (50/50 v/v) using a Waring blender. The solid was washed with water, aqueous NaHCO$_3$ (2.5 wt. %) until pH 7, water, water/methanol (50/50 v/v) (3x), and methanol. The solid was dried in a vacuum oven followed by a Schlenk line. The product was isolated as a fine white powder (51.88 g, 94% yield). The degree of substitution was determined by $^1$H NMR in CDCl$_3$ (DS$_H$=0.4, DS$_A$=1.8). SEC (in HFIP) indicated a M$_w$ of 209 kDa.

Glucan Hexanoate Acetate was prepared at various hexanoate to acetate ratios. High hexanoate substitution decreased the melt/flow temperature as shown in Table 12.

TABLE 12

| Example # | Hexanoate DoS | Acetate DoS | Melting temp. | Flow temp. |
|---|---|---|---|---|
| E7A | 1.8 | 0.3 | 125° C. | 150° C. |
| E7B* | 0.4 | 1.8 | 200° C. | 215° C. |
| E7C | 0.7 | 1.6 | 200° C. | 215° C. |

Glucan hexanoate acetate was molded and the tensile properties are shown below. The degree of substitution of the hexanoate ester had a large impact on the tensile strength of the material (lower hexanoate substitution gave superior properties) as shown in Table 13.

TABLE 13

| Example # | Hexanoate DoS | Acetate DoS | Molding temp. | Plasticizer | Tensile Strength (MPa) | Elongation at break (%) |
|---|---|---|---|---|---|---|
| E7A | 1.8 | 0.3 | 180° C. | none | 22 ± 1.5 | 17.2 ± 1.7 |
| E7B* | 0.4 | 1.8 | 220° C. | none | 88.4 ± 0.2 | 18.8 ± 2.0 |

Example 8: Poly Alpha-1,3-Glucan Laurate

*Vacuum dried poly alpha-1,3-glucan powder (51.68 g) was added to stirring DMAc (675 mL) in a 2 liter reaction kettle. The suspension was heated to 100° C. for 1 hour, LiCl (29.225 g) and DMAc (75 mL) were added, and the solution was stirred for 2 hours. The solution was cooled to 60° C. and lauroyl chloride (230 mL) in chilled DMAc (250 mL) was added to the reaction followed by pyridine (100 mL, drop-wise). The solution was stirred for 15 hours and cooled. The solvent was decanted and the gel was precipitated into methanol using a Waring blender. The solid was filtered and washed with methanol, water (2×), and methanol (2×), dried in a vacuum oven overnight, and then on a Schlenk line. The solid was dissolved in chloroform and precipitated into methanol using a Waring blender. The solid was filtered and washed with acetone (2×) and dried in a vacuum oven followed by a Schlenk line. The product was isolated as a fine white powder (175 g, 95% yield). The degree of substitution was determined via $^1$H NMR in CDCl$_3$ (DS$_L$=2.3). SEC (in THF) indicated a M$_w$ of 336 kDa.

** Vacuum dried poly alpha-1,3-glucan powder (70.94 g) was added to stirring DMAc (675 mL) in a 2 liter reaction kettle. The suspension was heated to 100° C. for 45 minutes, cooled to 60° C., and a solution of lauroyl chloride (300 mL) in DMAc (200 mL) was added. The viscous solution was stirred for 2 hours. The solvent was decanted and the gel was precipitated into methanol using a Waring blender. The solid was filtered and washed with aqueous NaHCO$_3$ (2.5 wt. %) until pH 7, water, and methanol (2×). The solid was dried in a vacuum oven followed by a Schlenk line. The product was isolated as a fine white powder (214 g, 96% yield). The degree of substitution was determined via 1H NMR in CDCl$_3$ (DS$_L$=1.9). SEC (in THF) indicated a M$_w$ of 295 kDa.

Glucan laurate with degrees of substitution (DoS) from 1.1 to 2.4 were prepared. We found that the DoS has a marked effect on the melt temperature and the material's properties. For example, glucan laurate with a DoS of 1.1 melts at ~200° C., but never flows; at a DoS of 2.4, the material melts at ~100° C. and flows at 125° C. Intermediate DS materials had melt and flow temperatures in-between the two samples as shown in Table 14.

TABLE 14

| Example # | Laurate DoS | Melting temp. | Flow temp. |
|---|---|---|---|
| E8A | 1.1 | 200° C. | >D.T. |
| E8B | 1.3 | 200° C. | 250° C. |
| E8C | 1.5 | 175° C. | 200° C. |
| E8D | 1.6 | 175° C. | 200° C. |
| E8E** | 1.9 | 175° C. | 190° C. |
| E8F* | 2.3 | 125° C. | 150° C. |
| E8G | 2.4 | 100° C. | 125° C. |
| E8H | 2.5 | | |
| E8I | 2.0 | | |

Example 9: Poly Alpha-1,3-Glucan Palmitate

Poly alpha-1,3-glucan palmitate (E9A) was prepared using the procedure of Example E8F except palmitoyl chloride was used in place of lauroyl chloride. The degree of substitution was 2.1 as determined via $^1$H NMR in CDCl$_3$. SEC (in THF) indicated a M$_w$ of 358 kDa.

Glucan laurate E8H, E8I, and palmitate E9A were melt blown to prepare nonwoven webs using an extruder and spinneret. The extruder screw diameter was 2.54 cm and the spinneret had 740 nozzles split evenly into 4 rows of 220 μm diameter. The spinneret had capillaries with a length-to-diameter ratio of 24:1. A 200 μm stainless-steel wire mesh filter screen was used to prevent non-melting particles from clogging the spinneret. Polypropylene (PP) was used as a comparative example.

Pellets of E8H, E8I, and E9A were dried overnight at 105° C. The polypropylene sample used was Moplen HP2774 available from Lyondellbasell. The degree of substitution was quantified by NMR analysis and the average molecular weight was calculated from SEC data. The melt blowing processing parameters used for each ester sample are shown in Table 15.

TABLE 15

Processing Parameters for Melt Blowing

| Sample | PP | E8H | E8I | E9A |
|---|---|---|---|---|
| Extruder Zone 1 (° C.) | 170 | 130 | 150 | 140 |
| Extruder Zone 2 (° C.) | 200 | 180 | 180 | 180 |
| Extruder Zone 3 (° C.) | 215 | 210 | 210 | 210 |
| Clamp Ring Temperature (° C.) | 220 | 215 | 225 | 215 |
| Actual Die A Temperature (° C.) | 220 | 215 | 230 | 215 |
| Actual Die B Temperature (° C.) | 220 | 215 | 230 | 215 |
| Extruder Speed (RPM) | 55 | 55 | 55 | 55 |
| Melt Temperature (° C.) | 217 | 213 | 219 | 213 |
| Melt Pressure (psi) | 670 | 759-800 | 790 | 400-1100 |
| Die Air Temperature Set PT (° C.) | 190 | 225 | 240 | 225 |
| Die Air Temperature (° C.) | 190 | 225 | 240 | 225 |
| Die Air Pressure (psi) | 10 | 5.0 | 5.0 | 5.4 |
| Air Over Temperature Actual (° C.) | 241 | 404 | 423 | 404 |
| Ambient Temperature (° C.) | 30 | 24.4 | 27.8 | 26.1 |
| Die to Collector Distance (m) | 0.45 | 0.13 | 0.13 | 0.20 |

E8H was difficult to melt blow because it started to melt on the screw, thus preventing continuous feeding of the polymer through the nearby extruding zones. The web produced had very thick and brittle fibers and was not tested further for its performance properties. E8I and E9A were successfully melt blown, as was the polypropylene sample.

The polypropylene produced a white web, whereas E8I and E9A produced a light gold colored web. There was poor cohesion of E8I and E9A fibers resulting in weak webs with easily detachable fibers.

Various properties of the melt blown webs are shown in Table 16. Areal density was measured in accordance with WSP 130.1.R4, thickness was measured in accordance with WSP 120.6.R4 (12), tensile strength was measured in accordance with NWSP 110.4.RO (15)—option A, and air permeability was tested in accordance with standard BS EN ISO 9073-15:2008. Fiber diameter was analyzed using scanning electron microscopy SEM) and Image Pro Plus software was used to measure the fiber diameter from the image. Fiber diameters were taken manually across the width of each fiber. Fiber diameters in the table were the average of 75 measurements.

The mean fiber diameter in the polypropylene webs was lower and had a narrower distribution than the fibers in the E8I and E9A produced webs. The air permeability was much higher for E8I and E9A webs than for polypropylene, likely due to larger pore sizes within the web.

The dry and wet tensile strengths were much lower for the melt blown webs produced from E8I and E9A than for polypropylene.

TABLE 16

Melt Blown Web Properties

| Sample | PP web | E8H web | E8I web | E9A web |
|---|---|---|---|---|
| Average Areal Density (gsm) | 60.86 ± 1.93 | n.d. | 55.89 ± 1.23 | 58.97 ± 2.75 |
| Average Thickness (mm) | 0.44 ± 0.03 | n.d. | 0.33 ± 0.01 | 0.44 ± 0.04 |
| Air Permeability at 100 Pa ($cm^3 \cdot cm^{-2} \cdot s^{-1}$) | 16.40 ± 0.43 | n.d. | 37.62 ± 2.55 | 65.14 ± 6.06 |
| Fibre Diameter (µm) | 3.18 ± 1.66 | n.d. | 6.16 ± 2.96 | 7.23 ± 3.45 |
| Dry Tensile Strength (N/25 mm) | 22.72 ± 0.67 | n.d. | 0.97 ± 0.27 | 0.64 ± 0.07 |
| Wet Tensile Strength (N/25 mm) | 2.67 ± 0.16 | n.d. | Below detection | Below detection | n.d.-not determined

Wettability of these nonwoven webs was measured using both water and oil and the results are shown in Table 17. A pipette was used to deposit 25 µL of distilled water (72.04 mN·m−1) and generic oil (29.81 mN·m−1) on the surface of the webs. A digital camera was used to capture the wetting of the droplet on melt blown surfaces, and the contact angle was measured using Image Pro software. The polypropylene, E8I, and E9A webs were all hydrophobic and oleophillic but E8I and E9A webs were about 10% less hydrophobic than polypropylene.

TABLE 17

Wetting Properties of Melt blown Webs

| Sample | PP web | E8H web | E8I web | E9A web |
|---|---|---|---|---|
| Average Contact Angle w/ Water (°) | 116.40 ± 3.84 | n.d. | 106.49 ± 1.51 | 103.85 ± 1.70 |
| Average Contact Angle w/ Oil (°) | 0 ± 0 | n.d. | 12.13 ± 0.70 | 9.35 ± 1.11 |

Glucan laurate was injection molded without plasticizer. Compared to the previous derivatives, the long chain ester significantly decreased the tensile strength, but substantially increased the elongation at break as shown in Table 18.

TABLE 18

| Example # | Laurate DoS | Molding temp. | Tensile Strength (MPa) | Elongation at break (%) | Izod impact strength (J/m) |
|---|---|---|---|---|---|
| E8F | 2.3 | 125° C. | 7.6 ± 0.4 | 39.6 ± 6.9 | |
| E8E | 1.9 | 190° C. | 8.8 ± 1.2 | 55.9 ± 18 | 33 ± 6 |

Example 10: Poly Alpha-1,3-Glucan Laurate Acetate

Glucan laurate acetate has been prepared at varying amounts of laurate content to assess the physical properties as shown in Table 19.

*Vacuum dried poly alpha-1,3-glucan powder (47.07 g) was added to stirring DMAc (450 mL) in a 1 liter reaction kettle. The suspension was heated to 100° C. for 30 minutes, cooled to 60° C., and a solution of lauroyl chloride (130 mL) in DMAc (100 mL) was added. After 5 minutes, acetic anhydride (53 mL) was added dropwise to the reaction, which was stirred at 60° C. for 4.5 hr. The viscous solution was precipitated into methanol using a Waring blender. The solid was filtered and washed with MeOH, aqueous $NaHCO_3$ (2.5 wt. %) until pH 7, water, and methanol (2×). The solid was dried in a vacuum oven followed by a Schlenk line. The product was isolated as a fine white powder (120.27 g, 92% yield). The degree of substitution was determined by $^1H$ NMR in $CDCl_3$ ($DS_L$=1.4, $DS_A$=0.7). SEC (in THF) indicated a $M_w$ of 215 kDa.

** Vacuum dried poly alpha-1,3-glucan powder (54.25 g) was added to stirring DMAc (550 mL) in a 1 liter reaction kettle. The suspension was heated to 100° C. for 45 minutes, cooled to 50° C., and solutions of lauroyl chloride (35 mL) in DMAc (25 mL) and acetyl chloride (100 mL) in DMAc (50 mL) were added. The reaction was heated to 60° C. and stirred for 3 hours. The viscous solution was precipitated into water/methanol (50/50 v/v) using a Waring blender. The solid was filtered and washed with water, aqueous $NaHCO_3$ (2.5 wt. %) until pH 7, water, and methanol (3×). The solid was dried in a vacuum oven followed by a Schlenk line. The product was isolated as a fine off-white powder (87.57 g, 82% yield). The degree of substitution was determined by $^1H$ NMR in $CDCl_3$ ($DS_L$=0.2, $DS_A$=2.5). SEC (in THF) indicated a $M_w$ of 335 kDa.

TABLE 19

| Example 10 # | Laurate DoS | Acetate DoS | Melting temp. | Flow temp. |
|---|---|---|---|---|
| E10A* | 1.4 | 0.7 | 175° C. | 220° C. |
| E10B | 0.7 | 1.4 | 220° C. | 220° C. |
| E10C | 0.5 | 2.0 | 200° C. | 225° C. |
| E10D** | 0.2 | 2.5 | 200° C. | 225° C. |

Glucan laurate acetate was injection molded into mini-tensile bars without plasticizer, and the tensile properties are shown in the Table 20. Samples with high laurate content were found to have low tensile and impact strength and high elongation at break, whereas samples with low laurate content showed the opposite trend, see table below.

TABLE 20

| Example # | Laurate DoS | Acetate DoS | Molding temp. | Tensile Strength (MPa) | Elongation at break (%) | Izod impact strength (J/m) |
|---|---|---|---|---|---|---|
| E10A | 1.4 | 0.7 | 220° C. | 14.6 ± 1.3 | 74.8 ± 22.6 | 29 ± 2 |
| E10B | 0.7 | 1.4 | 225° C. | 30.4 ± 1.9 | 19.4 ± 1.2 | 24 ± 7 |
| E10C | 0.5 | 2.0 | 185° C. | 39.2 ± 1.5 | 16.7 ± 1.5 | 53 ± 8 |
| E10D | 0.2 | 2.5 | 230° C. | 69 ± 10.8 | 9.2 ± 1.4 | 218 ± 49 |

Example 11: Poly Alpha-1,3-Glucan Palmitate Acetate

*Vacuum dried poly alpha-1,3-glucan powder (53.64 g) was added to stirring DMAc (450 mL) in a 1 liter reaction kettle. The suspension was heated to 100° C. for 60 minutes, cooled to 50° C., and solutions of palmitoyl chloride (95 mL) in DMAc (75 mL) and acetyl chloride (75 mL) in DMAc (75 mL) were added. The reaction was heated to 60° C. and stirred for 4 hours. The viscous solution was precipitated into water/methanol (50/50 v/v) using a Waring blender. The solid was filtered and washed with water, aqueous NaHCO$_3$ (2.5 wt. %) until pH 7, water, and soaked in water/methanol (50/50 v/v) for 16 hours. The solid was filtered and soaked in methanol for 48 hours, re-filtered, and washed twice with methanol. The solid was dried in a vacuum oven followed by a Schlenk line. The product was isolated as a fine white powder (102.6 g, 87% yield). The degree of substitution was determined by $^1$H NMR in CDCl$_3$ (DSPa=0.4, DS$_A$=2.1). SEC (in THF) indicated a M$_w$ of 294 kDa.

Glucan palmitate acetate was prepared at varying degrees of substitution. The materials melted at a similar temperature, but the polymer with higher palmitate substitution flowed at a lower temperature as shown in Table 21.

TABLE 21

| Example # | Palmitate DoS | Acetate DoS | Melting temp. | Flow temp. |
|---|---|---|---|---|
| E11A | 1.54 | 0.7 | 175° C. | 180° C. |
| E11B* | 0.4 | 2.1 | 175° C. | 215° C. |

Glucan palmitate acetate was injection molded into mini-tensile bars and the tensile properties evaluated as shown in Table 22.

TABLE 22

| Example # | Palmitate DoS | Acetate DoS | Molding temp. | Plasticizer | Tensile Strength (MPa) | Elongation at break (%) |
|---|---|---|---|---|---|---|
| E11B | 0.4 | 2.1 | 210° C. | none | 49.7 ± 3.4 | 20.9 ± 1.3 |

Example 12: Poly Alpha-1,3-Glucan Benzoate Acetate

Poly alpha-1,3-glucan powder (30.60 g) was added to stirring DMAc (275 mL) in a 1 liter reaction kettle. The suspension was heated to 100° C. for 45 minutes, cooled to 60° C., and a solution of benzoyl chloride (43 mL) in DMAc (50 mL) was added. The reaction was stirred for 3 hours at 60° C. at which time acetyl chloride (46 mL) in DMAc (50 mL) was added. The reaction was stirred for an additional 4.5 hours and precipitated from a water/methanol (50/50 v/v) solution using a Waring blender. The resulting solid was washed with water, then aqueous NaHCO3 (5 wt. %) until pH 7, water, water/methanol (50/50 v/v) (3×), and methanol (3×). The solid was dried in a vacuum oven followed by a Schlenk line. The product was isolated as a fine white powder (51.79 g, 82% yield). The degree of substitution was determined by $^1$H NMR in CDCl$_3$ (DS(Benzoyl)=0.8, DS$_A$=1.8). SEC (in HFIP) indicated a Mw of 216 kDa. The product was blended with 16 wt. % diethyl phthalate (DEP) plasticizer and injection molded into mini-tensile bars and the properties shown in Table 23.

TABLE 23

| Example # | Benzoate DoS | Acetate DoS | Molding temp. | Plasticizer | Tensile Strength (MPa) | Elongation at break (%) |
|---|---|---|---|---|---|---|
| 12 | 0.8 | 1.8 | 215° C. | 16% DEP | 36 ± 6.7 | 6.7 ± 2.1 |

Example 13: Poly Alpha-1,3-Glucan Acetate Pivalate

Vacuum dried poly alpha-1,3-glucan powder (4.55 g) was added to stirring DMAc (40 mL) in a 250 mL round bottom flask. The suspension was heated to 100° C. for 30 min, cooled to 60° C., and acetic anhydride (5.3 mL) was added to the reaction followed by a solution of pivaloyl chloride (10 mL) in DMAc (15 mL). The reaction was then stirred at 60° C. for 5 hours. The viscous solution was precipitated from a water/methanol (50/50 v/v) solution using a Waring blender. The solid was filtered and washed with water, aqueous $NaHCO_3$ (2.5 wt. %) until pH 7, water, and water/methanol (50/50 v/v) (3x). The solid was dried in a vacuum oven followed by a Schlenk line. The product was isolated as a white powder (7.43 g, 93% yield). The degree of substitution was determined by $^1H$ NMR in $CDCl_3$ ($DS_A$=1.19, DS(pivalate)=0.78). The melting temperature range of the polymer was 225-235° C. determined using a hot stage microscope.

Film Samples

Film samples were prepared for analysis according to ASTM D882. Film strips with 1 inch width and 6 inch length and tensile bars with a length of 80 mm and an inner width of 0.5 inches were prepared. The test samples were conditioned at 23° C., 50% relative humidity for greater than 40 hrs. Tensile bar samples were tested using an Instron 1122 load frame with a 2000 g load cell. Film strip samples were tested using an Instron 4391 load frame with a 250 lb. load cell that had been modified with longer extension capabilities.

Poly Alpha-1,3-Glucan Laurate Films

A film sample of poly alpha-1,3-glucan laurate (DoS 2.4) was prepared using 4.0 grams of vacuum-oven dried powder. The powder was placed between Teflon sheets and the Teflon sheets sandwiched between two metal plates. The metal plates were placed between the platens of a PHI, Manual, Bench Design, Hydraulic Compression Press (model # PW220C4-X1) at room temperature. The platens were closed without applying any additional pressure and the sample heated to 150° C. The sample was then subjected to the following compression cycle. First, 10,000 lbs. of pressure were applied for 1 min followed by a release of pressure for 1 min. This process was repeated twice for a total of three cycles. The sample was then exposed to 30,000 lbs. of pressure for 30 sec. followed by cooling to room temperature under pressure by running cooling water through the platens. The sample was removed from the press to provide a transparent film which was flexible enough to be folded without tearing. Table 24 shows some properties of the film.

TABLE 24

| Thickness (in) | Width (in) | Modulus (MPa) | Stress @ Max (MPa) | Strain @ Max (%) |
|---|---|---|---|---|
| 0.0050 | 0.50 | 69.3 ± 12.7 | 5.9 ± 0.8 | 106.1 ± 18.4 |

A film sample of poly alpha-1,3-glucan laurate having a DoS of laurate of 1.7 was prepared using 4.0 grams of vacuum-oven dried powder. The powder was placed between Teflon sheets and the Teflon sheets sandwiched between two metal plates. The metal plates were placed between the platens of a PHI, Manual, Bench Design, Hydraulic Compression Press (model # PW220C4-X1) at room temperature. The platens were closed without applying additional pressure and the sample heated to 200° C. The sample was then subjected to a compression cycle. First, 10,000 lbs. of pressure were applied for 1 min followed by a release of the pressure for 1 min. This process was repeated twice for a total of three cycles. After this, 30,000 lbs. of pressure were applied to the sample for 30 sec. The sample was then cooled to room temperature under pressure by running cooling water through the platens. Once room temperature was reached, the sample was removed from the metal plates and the Teflon sheet to provide a transparent film which was flexible enough to be folded without tearing. Table 25 shows some properties of the film.

TABLE 25

| Thickness (in) | Width (in) | Modulus (MPa) | Stress @ Max (MPa) | Strain @ Max (%) |
|---|---|---|---|---|
| 0.0030 | 0.50 | 175.7 ± 44.5 | 10.6 ± 0.7 | 21.4 ± 3.2 |

Poly alpha-1,3-Glucan Diacetate Film

A film sample of poly alpha-1,3-glucan diacetate (DoS of Acetate 2.5) was prepared by mixing 16 wt. % triethyl citrate (obtained from Sigma Aldrich) with poly alpha-1,3-glucan diacetate and extruded using a DSM Xplore™ model 2005 15 cm3 twin-screw micro compounder to form a plasticized material which was ground into small particles and dried in a vacuum-oven overnight. 4.0 grams of the dried material was placed between two Teflon sheets and the Teflon sheets then sandwiched between two metal plates which were placed between the platens of a PHI, Manual, Bench Design, Hydraulic Compression Press (model # PW220C4-X1) at room temperature. The platens were closed without applying additional pressure and the sample was heated to 195° C. The sample was then subjected to a compression cycle. First, 10,000 lbs. of pressure was applied for 1 min followed by a release of the pressure for 1 min. This process was repeated twice for a total of three cycles. The sample was then subjected to 30,000 lbs. of pressure for 30 sec. and then cooled to room temperature while still under pressure by running cooling water through the platens. Once room temperature was reached, the sample was removed from the metal plates and the Teflon sheet to provide a film. Table 26 shows some properties of the film.

TABLE 26

| Thickness (in) | Width (in) | Modulus (MPa) | Stress @ Max (MPa) | Strain @ Max (%) |
|---|---|---|---|---|
| 0.0087 | 1.0 | 1464.9 ± 317.5 | 11.4 ± 2.4 | 0.9 ± 0.1 |

Poly alpha-1,3-glucan Laurate Acetate Film

A film sample of glucan laurate acetate (DoS of Laurate 1.4, DoS of Acetate 0.7) was prepared using 4.0 grams of vacuum-oven dried powder. The dried powder was placed between Teflon sheets and the Teflon sheets sandwiched between two metal plates. The metal plates were placed between the platens of a PHI, Manual, Bench Design, Hydraulic Compression Press (model # PW220C4-X1) at room temperature. The platens were closed without applying additional pressure and the sample heated to 220° C. and subjected to a compression cycle. First, 10,000 lbs. of pressure was applied for 1 min followed by a release of the pressure for 1 min. This process was repeated twice for a total of three cycles. The sample was then subjected to 30,000 lbs. of pressure for 30 sec. The sample was then cooled to room temperature under pressure by running cooling water through the platens. Once room temperature was reached, the sample was removed from the metal plates and the Teflon sheet to provide a transparent film which was flexible enough to be folded without tearing. Table 27 shows some properties of the film.

TABLE 27

| Thickness (in) | Width (in) | Modulus (MPa) | Stress @ Max (MPa) | Strain @ Max (%) |
|---|---|---|---|---|
| 0.0027 | 0.50 | 330.8 ± 104.7 | 10.6 ± 2.6 | 21.5 ± 9.0 |

Film Transparency

Several poly alpha-1,3-glucan esters as disclosed herein were formed into films and tested for transparency (light transmission) and haze values with the results shown in Table 28. Light transmission analysis was measured using a Cary 5000 UV-VIS-NIR spectrophotometer equipped with an integrated sphere. Total luminous transmittance (Tt) was measured according to ASTMD1003:13. Haze analysis was completed with the same instrument configuration, per ASTM D1003:13. Film thickness tested ranged from 2 to 3.25 mm.

TABLE 28

| Sample | DoS | Thickness (mm) | $T_t$ (%) | Haze (%) |
|---|---|---|---|---|
| Glucan acetate | 2.5A* | 3.25 | 60 | 29 |
| Glucan laurate acetate | 0.4L**, 2.3A | 2 | 76 | 21 |
| Glucan laurate acetate | 1.4L, 0.8A | 3.25 | 84 | 18 |
| Glucan laurate | 2.2L | 3.25 | 83 | 21 |

*A is acetate
**L is laurate

The results in Table 28 clearly show that poly alpha-1,3-glucan esters as disclosed herein exhibit transmittance of at least 60 percent. Poly alpha-1,3-glucan esters which comprise both acetate and laurate acyl groups, or laurate acyl groups alone, exhibit superior transmittance than poly alpha-1,3-glucan esters which only comprise acetate acyl groups.

Comparative Examples

Cellulose acetate (DS 2.5) (C1) and cellulose acetate butyrate ($DS_A$=1.2, $DS_B$=1.7) (C2) were injection molded into mini-tensile bars and the tensile properties evaluated as shown in Table 29.

TABLE 29

| | plasticizer | Tensile Strength (MPa) | Elongation at Break (%) | Impact Strength (J/m) |
|---|---|---|---|---|
| C1 | 16% TEC | 64 | 23 | 46 |
| C2 | none | 51 | 21 | 80 |

The cellulose diacetate (C1) and cellulose acetate butyrate (C2) compositions tended to be less stiff, have lower tensile strength, have lower impact strength, and have higher elongation at break as compared to the poly alpha-1,3-glucan ester compounds and poly alpha-1,3-glucan ester compositions disclosed herein.

In accordance with the invention disclosed, poly alpha-1,3-glucan ester compounds and poly alpha-1,3-glucan ester compositions, and articles made from the aforementioned have been provided that satisfy the advantages described herein.

Embodiments

For further illustration, additional non-limiting embodiments of the present disclosure are set forth below.

For example, embodiment 1 is a composition comprising a poly alpha-1,3-glucan ester compound represented by the structure:

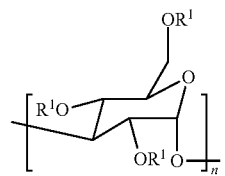

wherein: (i) n is at least 6 and (ii) each $R^1$ is independently selected from H or an acyl group, the acyl group being independently selected from the group consisting of: a) an acetyl; b) a benzoyl; c)

c)

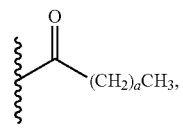

wherein a is independently 7-24; and d)

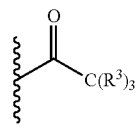

wherein $R^3$ can be independently selected from H atoms, linear alkyl groups, branched alkyl groups, cyclic alkyl groups, and aryl groups comprising from one to 24 carbon atoms; and with the proviso that if $R^1$ is acetyl then at least one other $R^1$ is a benzoyl or

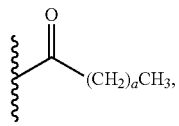

wherein a is independently 7-24, and wherein the poly alpha-1,3-glucan ester compound has a degree of substitution of 0.001 to 3.0.

Embodiment 2 is the composition of embodiment 1, wherein the poly alpha-1,3-glucan ester compound has a degree of substitution in a range from about 0.3 to about 3.0.

Embodiment 3 is the composition of embodiments 1-2, wherein the poly alpha-1,3-glucan compound has a degree of substitution in a range from about 1.5 to about 3.0.

Embodiment 4 is the composition of embodiments 1-3, wherein the poly alpha-1,3-glucan compound has a degree of substitution in a range from about 2.2 to about 2.9.

Embodiment 5 is the composition of embodiments 1-4, wherein a is independently 7-16.

Embodiment 6 is the composition of embodiments 1-5, wherein a is independently 9-16.

Embodiment 7 is the composition of embodiments 1-6, wherein $R^1$ is acetyl and

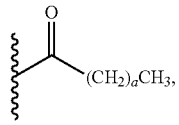

and a is 10.

Embodiment 8 is the composition of embodiments 1-6, wherein $R^1$ is acetyl and

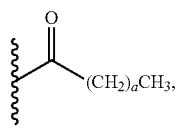

and a is 14.

Embodiment 9 is the composition of embodiments 1-4, wherein $R^1$ is acetyl and benzoyl.

Embodiment 10 is the composition of embodiment 1, wherein $R^1$ is

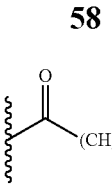

a is 14, and the degree of substitution is in a range from about 1.2 to about 2.4.

Embodiment 11 is the composition of embodiment 1, wherein $R^1$ is acetyl with a degree of substitution in a range from about 0.7 to about 2.9; and $R^1$ is wherein a is 10 and with a degree of substitution in a range from about 0.1 to about 1.4.

Embodiment 12 is the composition of embodiment 1, wherein $R^1$ is acetyl with a degree of substitution in a range from about 0.7 to about 2.75; and $R^1$ is

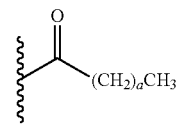

wherein a is 14 and with a degree of substitution in a range from about 0.15 to about 1.5.

Embodiment 13 is the composition of embodiment 1, wherein $R^1$ is acetyl with a degree of substitution in a range from about 1.7 to about 1.9; and $R^1$ is benzoyl with a degree of substitution in a range from about 0.6 to about 0.8.

Embodiment 14 is the composition of embodiment 1, wherein $R^1$ is

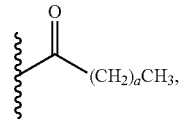

wherein a is 14, with a degree of substitution in a range from about 0.15 to about 1.8.

Embodiment 15 is the composition of embodiment 1, wherein $R^1$ is acetyl and

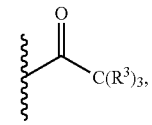

wherein two $R^3$ are methyl groups, and the third $R^3$ is H.

Embodiment 16 is the composition of embodiments 1-2, wherein $R^1$ is acetyl and benzoyl.

Embodiment 17 is the composition of embodiment 16, wherein the degree of substitution of acetyl is in a range from about 1.7 to about 1.9 and the degree of substitution of benzoyl is in a range from about 0.6 to about 0.8.

Embodiment 18 is the composition of embodiment 1, wherein $R^1$ is at least one

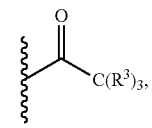

wherein one $R^3$ is H, another $R^3$ is ethyl, and the third $R^3$ is a linear butyl group.

Embodiment 19 is the composition of embodiment 1, wherein $R^1$ is at least one

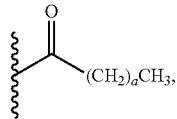

wherein a is 15.

Embodiment 20 is the composition of embodiment 1, wherein $R^1$ is at least one

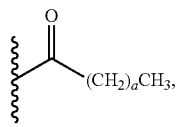

wherein a is 16.

Embodiment 21 is a composition comprising: (A) a poly alpha-1,3-glucan ester compound represented by the structure:

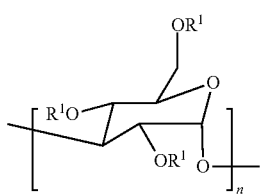

wherein: n is at least 6 and each $R^1$ is independently selected from H or an acyl group, the acyl group being independently selected from the group consisting of: (i) an acetyl, (ii) a formyl, and (iii)

(iii)

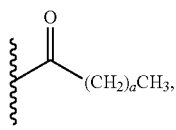

wherein a is independently 0-6 (or 1-6), wherein the poly alpha-1,3-glucan ester compound has a degree of substitution of 0.001 to 3.0; and (B) a plasticizer.

Embodiment 22 is the composition of embodiment 21, wherein the poly alpha-1,3-glucan ester compound has a degree of substitution in a range from about 1.5 to about 3.0

Embodiment 23 is the composition of embodiments 21-22, wherein the poly alpha-1,3-glucan ester compound has a degree of substitution in a range from about 2.4 to about 3.0.

Embodiment 24 is the composition of embodiments 21-23, wherein $R^1$ is an acetyl and

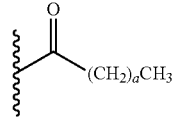

and a is 1.

Embodiment 25 is the composition of embodiment 21, wherein $R^1$ is acetyl with a degree of substitution in a range from about 0.2 to about 1.6; and $R^1$ is

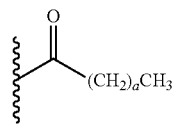

wherein a is 1 with a degree of substitution in a range from about 1.1 to about 2.5.

Embodiment 26 is the composition of embodiment 21, wherein $R^1$ is an acetyl and

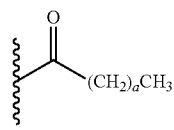

and a is 2.

Embodiment 27 is the composition of embodiment 21, wherein $R^1$ is acetyl with a degree of substitution in a range from about 0.8 to about 1.3; and $R^1$ is

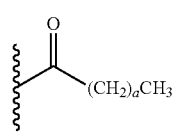

wherein a is 2 with a degree of substitution in a range from about 0.5 to about 1.7.

Embodiment 28 is the composition of embodiment 21, wherein $R^1$ is an acetyl.

Embodiment 29 is the composition of embodiment 28, wherein $R^1$ has a degree of substitution in a range from about 2.1 to about 2.7.

Embodiment 30 is the composition of embodiment 21, wherein $R^1$ is an acetyl and formyl.

Embodiment 31 is the composition of embodiment 30, wherein $R^1$ is acetyl with a degree of substitution in a range from about 0.8 to about 2.9 and formyl with a degree of substitution in a range from about 0.1 to about 1.7.

Embodiment 32 is the composition of embodiment 21, wherein $R^1$ is formyl and

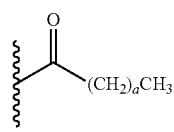

and a is 1.

Embodiment 33 is the composition of embodiment 32, wherein the formyl has a degree of substitution in a range from about 1.2 to about 1.5 and the

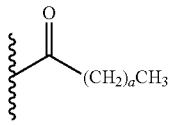

has a degree of substitution in a range from about 1.3 to about 1.8.

Embodiment 34 is the composition of embodiments 21-22, wherein $R^1$ is formyl and

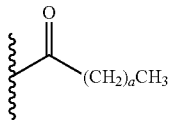

and a is 2.

Embodiment 35 is the composition of embodiment 34, wherein the formyl has a degree of substitution in a range from about 1.5 to about 1.6, and the

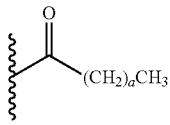

has a degree of substitution in a range from about 1.1 to about 1.2.

Embodiment 36 is the composition of embodiments 21-35, wherein the plasticizer is selected from the group consisting of phthalate esters, phosphate esters, glycerol esters, triethylene glycol based esters, and esters of adipic acid, azelaic acid, citric acid, sebacic acid, and tartaric acid.

Embodiment 37 is the composition of embodiments 21-36, wherein the plasticizer is selected from the group consisting of triethyl citrate, diethyl phthalate, and bis(2-ethylhexyl) adipate.

Embodiment 38 is a continuous, free-standing film comprising any of the compositions of embodiments 1-37.

Embodiment 39 is a flexible package comprising any of the compositions of embodiments 1-37.

Embodiment 40 is the flexible package of embodiment 39 selected from the group consisting of a blister pack base, a strip pack base, a metal/plastic sheet, a paper/plastic laminate, a pouch, a wrap, and a bag.

Embodiment 41 is a rigid package comprising any of the compositions of embodiments 1-37.

Embodiment 42 is the rigid package of embodiment 41 selected from the group consisting of bottles, jars, ready meal trays, trays, cosmetic containers, squeezable tubes, and thin wall containers.

Embodiment 43 is an article comprising any of the compositions of embodiments 1-37, wherein the article is made by injection molding.

Embodiment 44 is a continuous fiber comprising any of the compositions of embodiments 1-37.

Embodiment 45 is a staple fiber comprising any of the compositions of embodiments 1-37.

Embodiment 46 is a nonwoven fabric comprising at least one continuous fiber comprising any of the compositions of embodiments 1-37.

Embodiment 47 is the nonwoven fabric of embodiment 46 comprising a plurality of continuous fibers comprising the composition of embodiments 1-37.

Embodiment 48 is a medical-related article selected from the group consisting of: an isolation gown, a surgical gown, a surgical drape, a surgical cover, a surgical mask, a surgical scrub suit, a surgical cap, a gloves, a shoe cover, a bath wipe, and a wound dressing; wherein the medical-related article comprises at least one fiber comprising any of the compositions of embodiments 1-37.

Embodiment 49 is a filter selected from the group consisting of: a gasoline filter, an oil filter, an air filter, a water filter, a coffee filter, a tea bag, a liquid cartridge, a bag filter, a vacuum bag, an allergen membrane, and an allergen laminate; wherein the filter comprises at least one fiber comprising any of the compositions of embodiments 1-37.

Embodiment 50 is a hygiene-related article selected from the group consisting of: a wipe and a backsheet a pad, a diaper or a cloth; wherein the hygiene-related article comprises at least one fiber comprising any of the compositions of embodiments 1-37.

Embodiment 51 is a sanitary-related article selected from the group consisting of: a baby hygiene product, a child hygiene product, a female hygiene product, an incontinence product, a pads, an absorbing pad, and a wiping cloth; wherein the sanitary-related article comprises at least one fiber comprising any of the compositions of embodiments 1-37.

Embodiment 52 is a hot melt adhesive comprising any of the compositions of embodiments 1-37.

Embodiment 53 is a sealant comprising any of the compositions of embodiments 1-37.

Embodiment 54 is personal care product, pharmaceutical product, household product, or industrial product comprising any of the compositions of embodiments 1-37.

What is claimed is:

1. A product comprising a poly alpha-1,3-glucan compound consisting of one poly alpha-1,3-glucan ester polymer chain represented by the following structure:

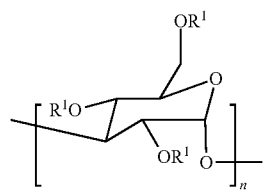

wherein the poly alpha-1,3-glucan ester polymer chain is linear;
wherein: (i) n is at least 6 and (ii) each $R^1$ is independently H or an acyl group, wherein the acyl group is:
(a) a benzoyl; or
(b)

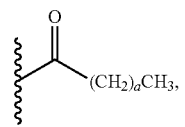

wherein "a" is 7 to 24;
wherein the poly alpha-1,3-glucan ester compound has a degree of substitution of 0.3 to 3.0;
wherein 100% of the glycosidic linkages of the poly alpha-1,3-glucan ester compound are alpha-1,3 linkages,
wherein a poly alpha-1,3-glucan used to produce the poly alpha-1,3-glucan ester compound is linear/unbranched; and
wherein the product is a laundry detergent or a dishwashing detergent, and wherein the product further comprises at least one enzyme.

2. The product of claim 1, wherein the "a" of the

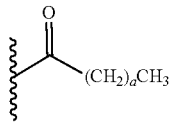

is 9 to 16.

3. The product of claim 1, wherein at least one of said $R^1$ is said benzoyl.

4. The product of claim 1, wherein n is between 10 and 4000.

5. The product of claim 1, wherein n is at least 600.

6. The product of claim 1, wherein the enzyme is a protease, cellulase, hemicellulase, peroxidase, lipolytic enzyme, xylanase, phospholipase, perhydrolase, cutinase, pectinase, pectate lyase, mannanase, keratinase, reductase, oxidase, phenoloxidase, lipoxygenase, ligninase, pullulanase, tannase, pentosanase, malanase, beta-glucanase, arabinosidase, hyaluronidase, chondroitinase, laccase, metalloproteinase, amadoriase, glucoamylase, arabinofuranosidase, phytase, isomerase, transferase, nuclease, or amylase.

7. The product of claim 1, wherein the product further comprises at least one of a detergent builder, complexing agent, soil release polymer, surfactancy-boosting polymer, bleaching agent, bleach activator, bleaching catalyst, fabric conditioner, clay, foam booster, suds suppressor, anti-corrosion agent, soil-suspending agent, anti-soil redeposition agent, dye, bactericide, tarnish inhibitor, optical brightener, perfume, saturated or unsaturated fatty acid, dye transfer inhibiting agent, chelating agent, hueing dye, calcium cation, magnesium cation, visual signaling ingredient, antifoam, structurant, thickener, anti-caking agent, starch, sand, or gelling agent.

8. The product of claim 1, wherein the product is in the form of a liquid, gel, powder, hydrocolloid, aqueous solution, granule, tablet, capsule, bead or pastille, single compartment sachet, multi-compartment sachet, single compartment pouch, or multi-compartment pouch.

9. The product of claim 1, wherein the product is said laundry detergent.

10. The product of claim 1, wherein the product is said dishwashing detergent.

11. The product of claim 10, wherein the dishwashing detergent is an automatic dishwashing detergent.

12. The product of claim 3, wherein the product is said laundry detergent.

* * * * *